(12) United States Patent
Tester et al.

(10) Patent No.: US 7,239,238 B2
(45) Date of Patent: Jul. 3, 2007

(54) ELECTRONIC SECURITY SEAL

(75) Inventors: Theodore R. Tester, Portland, CT (US); Robert F. Debrody, Wayne, NJ (US); Donald A. Ruth, Newton, NJ (US)

(73) Assignee: E. J. Brooks Company, Livingston, NJ (US)

( * ) Notice: Subject to any disclaimer, the term of this patent is extended or adjusted under 35 U.S.C. 154(b) by 183 days.

(21) Appl. No.: 11/081,930

(22) Filed: Mar. 16, 2005

(65) Prior Publication Data

US 2005/0231365 A1  Oct. 20, 2005

Related U.S. Application Data

(60) Provisional application No. 60/557,482, filed on Mar. 30, 2004, provisional application No. 60/636,818, filed on Dec. 16, 2004.

(51) Int. Cl.
*G08B 1/08* (2006.01)

(52) U.S. Cl. .............. 340/539.31; 340/568.1; 340/568.2; 292/307 R

(58) Field of Classification Search ........ 340/568.1, 340/568.2, 572.1, 539.31; 292/307 R
See application file for complete search history.

(56) References Cited

U.S. PATENT DOCUMENTS

| | | | |
|---|---|---|---|
| 4,081,397 A * | 3/1978 | Booe | .......... 252/194 |
| 4,729,626 A | 3/1988 | Stieff | |
| 4,802,700 A | 2/1989 | Stevenson et al. | |
| 5,005,883 A | 4/1991 | Guiler | |
| 5,127,687 A | 7/1992 | Guiler | |
| 5,298,884 A | 3/1994 | Gilmore et al. | |
| 5,347,689 A | 9/1994 | Georgopoulos et al. | |
| 5,361,216 A | 11/1994 | Warn et al. | |
| 5,413,393 A | 5/1995 | Georgopoulos et al. | |
| 5,450,657 A | 9/1995 | Georgopoulos et al. | |
| 5,479,160 A | 12/1995 | Koelle | |
| 5,485,154 A | 1/1996 | Brooks et al. | |
| 5,541,604 A | 7/1996 | Meier | |
| 5,582,447 A | 12/1996 | Leon et al. | |
| 6,010,166 A | 1/2000 | Hamilton et al. | |
| 6,046,616 A | 4/2000 | Chan et al. | |

(Continued)

*Primary Examiner*—Jeffery Hofsass
*Assistant Examiner*—Edny Labbees
(74) *Attorney, Agent, or Firm*—Carella, Byrne et al.; John G. Gilfillan, III; William Squire

(57) ABSTRACT

A battery operated cable security seal for cargo containers and the like includes a housing with a transparent cover for visual inspection of illuminated internal green or red LEDs, the red LED representing a tampered state of a stranded metal locking cable, which has a length sufficient to secure the keeper bars and hasp of a cargo container door. The cable has an internal conductor whose conductivity, e.g., resistance, manifests a tampered condition when severed and also if reattached, e.g., by a solder or spliced joint and so on. The electrical continuity of the conductor is monitored by a circuit in one embodiment for a severed state, i.e., tampering, and whose resistance is monitored in a second embodiment correlated optionally to either or both ambient temperature and a battery output voltage. The seal housing has two compartments one being hermetically sealed and contains the circuitry and the other containing a cable locking device for receiving and locking the cable to the seal. The circuit includes an RFID tag which may be part of a mesh network configuration with other tags.

38 Claims, 18 Drawing Sheets

U.S. PATENT DOCUMENTS

| | | |
|---|---|---|
| 6,069,563 A | 5/2000 | Kadner et al. |
| 6,097,306 A | 8/2000 | Leon et al. |
| 6,265,973 B1 | 7/2001 | Brammall et al. |
| 6,297,735 B1 | 10/2001 | Abel |
| 6,389,853 B1 | 5/2002 | Pate et al. |
| 6,420,971 B1* | 7/2002 | Leck et al. ............... 340/542 |
| 6,519,982 B1 | 2/2003 | Brammall et al. |
| 6,542,114 B1 | 4/2003 | Eagleson et al. |
| 6,698,806 B2 | 3/2004 | Brammall et al. |
| 6,720,888 B2 | 4/2004 | Eagleson et al. |
| 6,727,817 B2* | 4/2004 | Maloney ............... 340/572.8 |
| 6,731,212 B2* | 5/2004 | Hirose et al. ........... 340/572.9 |
| 6,747,558 B1 | 6/2004 | Thorne et al. |
| 6,750,771 B1 | 6/2004 | Brand |
| 6,765,484 B2 | 7/2004 | Eagleson et al. |
| 2004/0041705 A1* | 3/2004 | Auerbach et al. ...... 340/539.22 |
| 2004/0113782 A1 | 6/2004 | Auerbach et al. |
| 2006/0202824 A1* | 9/2006 | Carroll et al. ........... 340/568.1 |

* cited by examiner

ELECTRONIC SECURITY SEAL

This application claims the benefit of provisional application Ser. No. 60/557,482 filed Mar. 30, 2004, entitled "RFID SEAL AND METHOD FOR INITIALIZATION" and Ser. No. 60/636,818 filed Dec. 16, 2004 entitled "ELECTRONIC SECURITY SEAL", incorporated by reference herein in their entireties This invention relates to security seals of the type including a stranded metal cable and a locking body for securing a door, including keeper bars and hasps used with cargo containers, trucks, warehouses, and the like, the seal including electronics for monitoring the locked and tampered states of the cable, the monitoring electronics preferably including an RFID tag transmission/interrogation device.

CROSS REFERENCE TO PATENTS AND APPLICATIONS

Of interest is U.S. patent application entitled "A Pseudo Random Telemetric Data Communication System" filed Mar. 26, 1999 in the name of Yap Hwa Seng et al. and assigned to TriTech Microelectronics Ltd. and P-serv Technologies Pte. Ltd., U.S. Pat. No. 6,046,616 assigned to TriTech Microelectronics Ltd., and U.S. Pat. Nos. 6,265,973; 6,097,306; 5,582,447, all assigned to the assignee of the present application, and all incorporated by reference herein in their entirety.

In the cargo industry, containers are widely employed. The containers have doors which are locked shut with hasps and secured with mechanical locking seals. Such seals include a steel bolt, as shown, for example, in commonly owned U.S. Pat. No. 6,265,973 which discloses an electronically operated seal by way of example. The bolts of seals, mechanical or electromechanical, have a head and shank which is attached to a locking body having a shank locking mechanism. The mechanical seals with a locking mechanism using a bolt seal may be of the type disclosed in commonly owned U.S. Pat. No. 4,802,700; 5,347,689; or 5,450,657.

Another mechanical seal, for use with a stranded metal wire cable, is disclosed in U.S. Pat. No. 5,582,447 ('447). When a bolt shank or metal stranded cable is inserted into the locking body of the seal, a locking collet or other equivalent arrangement permanently locks the shank or cable to the body.

The steel bolt seals and stranded cable seals are used widely used, for example, to lock the doors of cargo containers or railroad cars. In these applications, the containers or cars have doors including hasps that secure the handle in place. The handle operates keeper bars such as shown for example in commonly owned U.S. Pat. No. 6,519,982 ('982). The handle and keeper bar are shown in FIG. 1 of the '982 patent (and also in FIGS. 17-19 of the instant application) and a bolt seal is shown in FIG. 2 of the '982 patent for use with the hasps. Also disclosed is a seal protective cover not related to the present invention. A similar door hasp and keeper bar, bolt seal and seal protective cover arrangement is shown in commonly owned U.S. Pat. No. 6,010,166. A further bolt seal and protective cover arrangement for use on a rail car plug door is disclosed in commonly owned U.S. Pat. No. 6,698,806. The bolt seals in the above patents all use a bolt and a lock device with an internal locking member for securing the bolt to the hasp.

Cable seals using stranded metal cables are also used to secure such cargo doors. For example, the cable seal disclosed in the above noted U.S. Pat. No. 5,582,447 is currently employed with securing keeper bars of cargo doors. In this application the elongated cable is wrapped about the keeper bars and handles in a manner to secure the keeper bars.

Cargo containers are widely used on ocean going ships for shipping goods between countries and among different continents. Each ship can carry hundreds of such cargo containers. It is difficult if not impossible to monitor the tampering condition of the seals on all such containers, many of which carry valuable cargo. Over time, thieves have defeated the security of such cargo doors which typically use keeper bars discussed above. The keeper bars are attached to the containers by bolts and rivets. The thieves if they remove such bolts and rivets in an attempt to open the cargo doors, are prevented from opening the keeper bars by the cable seal arrangements discussed above.

Reference is made to commonly owned U.S. Pat. No. 5,582,447, noted above, which discloses a mechanical metal stranded cable locking mechanism employed to currently secure cargo container doors including their keeper bars. Reference is also made to commonly owned U.S. Pat. Nos. 5,005,883, 5,127,687, 4,802,700, 5,347,689, 5,413,393 and others for the disclosure of various bolt seals, all incorporated by reference in their entirety herein. Commonly owned U.S. Pat. No. 6,265,973 discloses an electronic security seal that uses a steel bolt. A steel bolt is used to secure the hasps of a cargo door handle and may be used in combination with a stranded metal cable seal of the type disclosed in the '447 patent noted above. The steel bolt by itself is insufficient to secure the keeper bars, thus requiring the use of a stranded metal cable seal.

See also the web site of the US Customs at www.cbp.gov (US Customs and Border Protection) for additional information regarding sealing truck cargo doors and cargo container doors. In particular, reference is made to the article entitled "Cargo Sealing Policy and Procedures for Fast Conveyances" which can be obtained by clicking on the link under "FAST Conveyance Cargo Sealing Policy & Procedures." This article discusses high security bolt seals, padlock/handcuff seals, authorized high security seals, bolt seal placement, and high security cable seal placement including photographs of the seals in place on a truck or cargo container door for securing keeper bars. In one application shown, the seal body is placed over a rivet holding the keeper bar bracket preventing access to the rivet and thus preventing the bracket and keeper bar from being removed. Other photos show the cable being wrapped about the keeper bar-handle pivot bracket which prevents the keeper bar from being rotated sufficiently to open the door. A similar application of a cable seal to a cargo door keeper bar arrangement is shown and described herein, FIGS. 17-19, for use with an electronic security seal according to the present invention depicted in FIGS. 1a and 1b. The seals shown in the web site photos are mechanical seals such as that described in the aforementioned '447 U.S. patent.

In the alternative, the stranded metal cable seal may also be used to seal the hasps alone as depicted by the electronic security seal of the present invention in FIG. 18 herein and generally depicted in FIG. 17 herein (and which also is shown wrapped about the keeper bars). However, the problem with this arrangement is that the electronic seal disclosed in U.S. Pat. No. '973 noted above is disclosed only as useful with a steel bolt. It can not be used with a stranded metal cable. There is a problem with using such a stranded metal cable in an electronic seal. This seal requires an electrical conductor to pass through the cable so that when the cable is severed, the electrical conductor is also severed presenting a tampered state. See for example the patent to Pate discussed above.

Because the present invention relates to an electromechanical cable seal data recording/playback apparatus with its control method; and, also to a radio transponder apparatus with its control method, a description of the prior art relating to the present invention relates to a number of different structures, a mechanical seal, a tamper detection and monitoring circuit and a transponder circuit for receiving and transmitting tamper conditions as described in the '973 patent and as employed in RFID circuits described therein.

Since a conventional electromechanical cable tamper detection circuit and a radio transponder are utilized for dissimilar purposes, they exhibit separate product forms. In recent years, various types of electromechanical seals have been widely used for remotely monitoring the condition of secured objects in order to deter tampering or theft involving the secured objects. See the '973 patent for example. Such electromechanical seals using bolts have also been widely used by the worldwide shipping industry to remotely monitor sealed cargo containers.

U.S. Pat. No. 6,265,973 to Brammall et al., noted above, discloses an electromechanical seal in which a fixed length bolt is locked to a seal housing, which is attached to the door handles of a cargo container. The electromechanical seal disclosed by the '973 patent only seals the cargo container's handle to its door, but does not seal the door itself, i.e., the keeper bars. A typical cargo container has four steel keeper bars, which are vertically aligned, and comprising rotating bars that engage latches located at the ends of each keeper bar to lock the doors to the cargo container's frame. Only the handle of the right-hand cargo container door is usually sealed via hasps. The cargo container door's handle is fastened to the door.

The present inventors recognize a need for an electromechanical security seal that will simultaneously seal the keeper bars of the doors and the handle which operates the keeper bars. The prior art seals discussed above using an electronic cable monitoring circuit are not disclosed as useful for operation with cargo container doors, especially containers that are transported aboard ocean going ships. In addition, they are insufficiently robust, leak moisture and use mechanisms and so on which are relative costly. They also do not deal with the problems encountered by seals used to seal containers shipped by sea. These containers may be secured over long periods of time such that the seals, which may be battery operated, lose voltage and thus may lose their ability to detect tampering. In addition, such containers are subjected to a wide variety of ambient conditions which also make monitoring the seals electronically more difficult. Shifts in electrical properties of the electrical conductor used with the cable being monitored may arise due to ambient atmosphere condition shifts thus causing errors in the detection of a tamper condition.

Cargo containers are shipped via ship, train and truck. Hundreds of containers may be on a single ship. When the containers are on board the ship or when unloaded, they may be subject to tampering and vandalism. It is important that such tampering be immediately noted to preclude theft of valuable cargo. To assist in such theft and tampering prevention, prior art seals are assigned serial numbers. These seals are then assigned to a container and lock the assigned container. The serial number, container number, the carrier, and the location are then entered on paper or into a local computer manually. The entry then is manually made to show that the container is being shipped out of that location.

Should a seal be tampered with, the event may be discovered at a different time and different location. It is also important to secure the keeper bars as required by the US Customs in certain situations as shown in the above cited web site.

The electronic seal disclosed in U.S. Pat. No. 6,265,973 is used with a steel bolt for locking container doors and the like. Such a bolt only seals the handle and not the door via its keeper bars as noted above. This bolt-type seal employs an electronic tagging device as described in the patent and also below herein. But this seal can not secure the keeper bars.

An electronic tagging device is commercially available that is programmable and which transmits information that is programmed, such as tagging identification serial numbers and other information as desired. This is referred to as radio frequency identification (RFID) which is well known in the art. Generally, an RFID tag will have a radio frequency (RF) transmitter, an RF receiver, an RF modulator, and a memory. The memory retains the digital code manifesting the identification number. The RF modulator extracts the digital code representing the identification number as a modulated signal which is applied to the RF transmitter. The RF receiver receives interrogation and control signals which manifest a request for the identification number.

Such systems provide security tagging for high value merchandise as it is transferred from the manufacturer to the consumer. Other applications include tagging of animals, humans and vehicles such as trucks and their cargo containers. Other applications include automatic toll collection systems.

FIG. 11 illustrates a prior art RFID communication system 214. The system includes an interrogator 216 and an RFID tag 218. The interrogator 216 includes a host controller 220 to process received information from the RFID tag 218 via antenna 222 and receiver 224. To retrieve information from the RFID tag 218, the host controller 220 generates an interrogation command signal which is transmitted by transmitter 226 and antenna 228 as signal 230. The tag 218 transmits RFID signal 232 via antenna 234 in response to receipt of the interrogation command signal 230. The receiver 224 receives the signal 232 via antenna 222. The signal 232 manifests the identification number of the tag 218.

The RFID tag 218 has an antenna 236 and a receiver 238 to receive the interrogation command signal 230 from the interrogator 216. The receiver 238 transfers the received command signal to a controller 240. The controller 240 interprets the command and extracts the corresponding identification number (ID) from memory 242. The extracted identification number is then transferred by the controller 240 to transmitter 244 which transmits the ID to antenna 234 which broadcasts the signal 232.

In active RFID tags, power 246 is provided by a battery. In passive RFID tags, the power is induced from the received signal. The signal 232 transmitted by the RFID tag 218 is modulated back scatter of the original signal transmitted by the interrogator 216. The controller 240 may have an interface, not shown, to receive data from external transponders such as temperature sensors, pressure sensors, global positioning sensing and other data including telemetric measurement data.

When multiple RFID tags 218 are simultaneously in close proximity to the interrogator 216 and the interrogator is broadcasting interrogation and control signals, the RFID tags may simultaneously respond. The responses may collide and the identification codes may be garbled and lost. Generally, the interrogator will rebroadcast commands to establish an order of broadcast of the RFID tags. This ordering of the broadcast is possible only from active RFID tags.

The aforementioned copending application Ser. No. 09/048,381 discloses a communication system that allows multiple transmitters of telemetric data to communicate with an interrogating receiving system, thus avoiding the collision problem of simultaneous transmissions, and is incorporated in the present invention circuit. Of interest also with respect to communication and tracking systems with tags are U.S. Pat. No. 6,765,484 (Entitled Method and Apparatus for Supplying Commands to a Tag wherein at least one operational characteristic of a tag is varies such as transmission rate, transmission power, a tag ID code, a password, an encryption code or which shifts the tag between a low power mode wherein its transmitter is disabled and a normal operational mode.), U.S. Pat. No. 6,747,558 (Entitled Method and Apparatus for Providing Container Security with a Tag which facilitates sealing and tracking containers using a bolt seal and at least one coil to generate a magnetic field induced in another coil, such that tampering with the bolt affects the magnetic field which manifests tampering.), U.S. Pat. No. 6,720,888 (Entitled Method and Apparatus for Tracking Mobile Devices using Tags wherein a sensor detects the presence of a mobile device and causes a signpost to change its code in its transmitted signals, the signpost transmitting signals to a beacon tag which in turn transmits high frequency signals to a reader.), U.S. Pat. No. 6,542,114 (Entitled Method and Apparatus for Tracking Items using Dual Frequency Tags wherein a beacon tag receives signpost radio frequency signals and transmits radio frequency signals containing signpost codes and a reader which receives the radio frequency signals. One of the signpost and tag is stationary and the other is movable.), and U.S. Pat. No. 6,750,771 (Entitled Antenna System and Method for Reading Low Frequency Tags wherein a reader identifies tags on pallets conveyed past the reader. The reader includes two interleaved linear arrays of antennae with circularly polarized fields which allows the reader to identify the tag from any tag orientation.).

U.S. Pat. No. 5,479,160 to Koelle provides an inexpensive circuit that consumes low power, can detect low level RF signal and RF signals of varying strength, and can reject intermittent low level RF interference. Logic circuitry is provided to insure that the read/write circuitry of the tag will not be activated unless the polarity of the reactivation signal is detected for a specified time.

U.S. Pat. No. 5,541,604 to Meier allows the use of a single set of circuitry in each of the interrogator and the transponder for transmission and reception of both powering and communication signals; without the need for synchronization between interrogators. PWM (pulse width modulation), PPM (pulse position modulation and FSK (frequency shift keying) transmission systems are disclosed.

U.S. Pat. No. 5,485,154 to Brooks et al. encompasses systems and methods of communicating with or identifying more than one remote device employing random sequence selection of a carrier signal frequency from a defined set of carrier frequencies. The remote device selects a carrier signal frequency and transmits data such as an identification code using that frequency and then reselects the same or a new carrier signal frequency for the next transmission event.

U.S. Pat. No. 6,420,971 ('971) to Leck et al. discloses an electronic seal including a padlock type housing and a closure member such as a shackle to form a seal. The closure member has an outer portion surrounding a core. A sensor assembly senses the integrity of the core such that tampering with the seal can be detected. The core is a fiber optic cable with an integrity sensor comprising an optical source and an optical detector. The optical cable can be bypassed by knowledgeable individuals using optical connectors and a parallel optical cable. A padlock seal is not satisfactory for securing keeper bars of a cargo door.

The system of the '971 patent uses a complex locking mechanism using a sacrificial latch or lock member to lock the ends of the cable to the lock body. The sacrificial member must be destroyed or removed to open the lock. This is not satisfactory as the lock member may be reinserted to appear that no tampering occurred. It is recognized by the present inventors that the most secure lock is one which can not be returned to its original state visually as well as physically, i.e., the locking element must be permanently severed as the only way to remove the lock.

Disclosed also is a cable comprising an outer steel sheath enclosing a central core comprising a wire for storing a charge and separated from each other by an insulating tube. The core terminates just before the releasable end of the cable encapsulated therein and forming a capacitor the capacitance depending upon the cable length. The unit measures the capacitance of the cable periodically in one second intervals. A change in length of the cable changes its capacitance indicating tampering.

In an alternative embodiment, described is a plurality of woven major strands with two of the major strands comprising an outer sheath of woven minor steel wire strands enclosing a conducting central core separated by an insulating tube. Two of the major strands are integrally connected at a releasable end to form a single loop strand extending from the fixed cable end to the releasable end and back to the fixed end. The remaining strands are not used for signal transmission so that only two of the multiple strands, e.g., five, are used and are difficult for a tamperer to defeat as he will not know which strands are live. This system is believed not viable for a cargo container system in that such containers may be tampered with out of view of others for a long period thus requiring a robust locking system wherein the seal can only be removed by cutting the cable, which is permanent damage to the system. Also, the cable may be bypassed with an identical cable (hot wired) which enables the primary cable to be defeated.

U.S. Pat. No. 6,389,853 to Pate et al. discloses an apparatus and method for deterring theft of a computer. The apparatus includes a lock having a housing and a retention member, such as an elongated member or tether cable. The retention member has a continuity detection element such as a wire having first and second conductors embedded therein and includes an outer cable portion made of metal stranded wire. The first and second conductors are electrically isolated from one another by insulation which also electrically isolates at least one of the conductors from the cable portion. The conductors have a first end at the anchoring end of the retention member electrically connected by a collar. The collar locks the free end of the retention member to a portion of the retention member adjacent to the free end to form an anchoring loop. The retention member is attached to the computer apparatus by a lock at a second end and terminates in the anchor portion, i.e., the loop, at the first end for anchoring the computer to an immovable object such as a desk or wall to deter unauthorized removal of the computer.

The lock is unlocked by a key which engages a key mechanism. The retention member, a cable with an electrical wire therein, is moved between a locked and an unlocked position by the key mechanism. A continuity detector detects unauthorized detachment of the security apparatus from the computer or a break in the continuity of the wire in the retention member by periodically polling the retention member wire for continuity, i.e., an open condition or break in the retention member wire.

The continuity detector compares a first reference voltage when the wire in the retention member is intact to a second reference voltage. When the security device is removed from the computer or the wire is broken. i.e., presents an open circuit, in the retention member, the first voltage changes, activating an alarm, and/or notifying a system administrator and/or partially or fully disabling the computer system. A problem with this system is that a stranded cable as disclosed therein may have the strands thereof pried apart to expose the inner conductor wire. A tamperer can then attach a hot wire across the retainer wire, i.e., by pass the retainer wire section with a parallel conductor wire. Then the retainer wire can be severed and the voltage there across will not manifest an open circuit. The cable can be cut and the product removed, the wire reattached by soldering and the cable welded so that tampering would not be readily evident. This is not satisfactory. Also, not dealt with is the problem that when the detector is battery operated, and the battery voltage decreases over time, the tamper measuring circuit can create false tamper indications not due to tampering, but due to the battery drained state.

A further problem with the above described arrangement is that it is complex and uniquely adapted for releasing a product such as a computer with a key. The tether cable is required to be formed into a loop for attachment to a desk or wall. The loop requires a collar which receives two free ends of conductors which are electrically connected by a connector embedded in the collar, which adds cost and which is also subject to tampering. For example, the free end of the conductors may be pulled free of the collar without affecting the integrity of the conductor continuity by hot wiring as noted above and immediately reconnecting the freed ends of the conductor. This is not satisfactory for a cargo container door seal.

In the alternative, the freed ends may be reattached in a period intermediate the polling of the voltage across the conductor, the intermediate polling period not being specified or being directed to this problem. This will defeat the seal by opening the loop and free the computer. Then the conductor's free ends can be reinserted into the collar so that evidence of tampering is not visually or electrically evident. Also the key lock is subject to tampering and adds cost unnecessary to a cargo container lock system. What is needed for cargo containers is a security seal that is simple, robust and low cost and once defeated can not be returned to a state where it is electrically and visually the same as if not defeated. Also needed is a seal that is adapted to deal with battery and environmental conditions that shift over time.

U.S. Pat. No. 5,298,884 to Gilmore et al. discloses a wearable tag with an electronic house arrest monitoring system (EHAM) which is held to a limb of the wearer by a lockable strap. The tag includes tamper detection circuitry for detecting any attempt to remove the tag by cutting or breaking the strap, even when the cutting is in the presence of an electrolyte. The strap has a highly electrically conductive conductor embedded therein that is in electrical contact through known resistances to respective terminals on the tag. The tamper detection detects any change in resistance of the strap that might occur when the conductor is severed by interrupting the current to the resistances connected thereto. This requires additional circuit components, i.e., resistors that are also used to detect immersion in an electrolyte by using dissimilar metals in the circuit.

The circuits perform two functions: 1) to transmit a unique identification signal that is processed by one or more receivers allowing the location of the wearer to be monitored and 2) to sense the occurrence of a tamper event such as an attempt to remove the tag and signal the remote receiver of such an occurrence. It purportedly detects when the resistance increases by the addition of a jumper placed across the strap or when voltage changes when immersed in an electrolyte in an attempt to defeat the system. This implies that such a bypass jumper will by pass the resistor(s) as well to change the resistance. Therefore, these resistors are essential to proper operation and add cost to the device. However, if the cable is bypassed in a region intermediate to the resistors, no change in voltage may be observed.

Stieff U.S. Pat. No. 4,729,626 discloses a self locking fiber optic seal. However, a fiber optic cable is not robust as a stranded metal cable and thus is more easily broken into and also may be bypassed as discussed above using well known optical couplers. Also the detection of the tamper condition requires comparison of light patterns, which is relatively complex. What is needed for cargo containers is a strong robust electronic locking seal that also can readily detect tampering at relatively low cost.

U.S. Pat. No. 6,297,735 to Abel discloses a lock for locking valve and electrical switch handles in an off position and incorporates a radio transmitter for reporting the status of the lock to a remote monitor. The lock has a cable which encircles the handle. One end of the cable is connected to the lock and locked in place. A conductor of an alarm subcircuit passes through the cable for detecting whether the cable has been cut. The monitor includes a radio receiver and a display for displaying the status of the lock using an RF transmitter in the device circuit.

U.S. Pat. No. 6,727,817 to Maloney discloses a tamper detection and prevention for an object control and tracking system, in particular, a key tracking system, and more particularly, a padlock type seal not useful for securing cargo door keeper bars. A key card is attached to a key having a touch memory device, RFID tag, or other circuitry for storing and transmitting an ID to a controller. A key is attached to the card by a conductive tether and transmission of the ID code passes through the tether. If the tether is cut, transmission is interrupted and indicates tampering.

In another embodiment, the tether is resistive, and circuitry monitors the voltage drop across the tether. An object of this patent is to detect removal of the key from its ID card while the card is left intact. This reference does not suggest its system is useful with cargo containers and the like. A change in voltage indicates tampering. The problem with this approach and others of the patents discussed above is that cargo containers aboard ships are subject to a wide variety of ambient weather conditions wherein the temperatures may vary significantly, for example, through out the world exhibiting extreme cold and hot temperatures variations. Since it is important to know when a fault occurred in the seal cable, this parameter needs to be accurate at all times. Also, if battery operated, shifting voltage values of the battery are not considered.

The present inventors recognize a problem with the Maloney approach and those of the seals described above in that electrical resistance may change during the course of travel of a container between its departure and arrival ports due to temperature or battery drain. Such changes could result in generating a false tamper condition. None of the above patents address this problem or provide a solution.

All of the above patents are incorporated herein by reference in their entirety. The present invention is directed to resolving the problems with the above described systems and locks which are not suitable in various ways as described for the need of a robust electronic cargo container security system to provide reliable tampering evidence at all times during transit of the cargo typically by ship under widely varying ambient conditions. Often, insurers, customs officials, government authorities, owners, leasors and so on need to know when and where tampering occurred.

An electronic security seal according to the present invention includes a housing having a cavity; a cable locking device in the cavity; a cable having a hollow core and a first sealed free end and a second end, the second end being secured fixedly secured in the cavity, the first free end for selective insertion into engagement with the received locking device to lock the free end in the cavity.

An electrical conductor is in the cable hollow core, the conductor having a given resistance R, the conductor forming a loop within the cable and extending adjacent to the cable sealed first end, the loop terminating in a second free end with the conductor forming a pair of conductors extending beyond the cable at the cable second end and electrically connected to a first circuit.

The first circuit is located in the housing cavity including a signal generating circuit for generating a first signal manifesting a first cable locked state indicating that the cable free end is locked, the first circuit being responsive to a sensed tamper condition of the conductor for generating a second signal manifesting the sensed tampered condition of the locked cable. A resistance measuring circuit periodically measures the resistance value of the electrical conductor loop, the first circuit being responsive to the measuring circuit for generating the second signal when the resistance value of the conductor loop differs from a predetermined reference value to provide a sensed tamper condition.

In one aspect, the first circuit includes a power source having an output voltage that decreases in value during a time period, the first circuit being arranged to correlate a reference resistance value for the conductor to a measured ambient temperature value and to a measured decreasing power source output voltage value. In a further aspect, the power source is a battery.

In a further aspect, the first circuit power source output voltage decreases in value during an elapsed time period and the first circuit includes a stored table in memory of reference power source output voltage values each corresponding to a reference resistance value, the circuit for measuring the power source output voltage value and for comparing the measured output voltage value with the stored reference voltage values to obtain a reference resistance value corresponding to the measured output voltage and for comparing the measured resistance value of the conductor to the obtained reference resistance value.

In a further aspect, the first circuit includes an ambient temperature sensor and a stored table of reference temperature values each corresponding to a reference resistance value, the circuit for periodically determining the ambient temperature and for comparing the determined ambient temperature value with the stored reference temperature values to obtain a reference resistance value and for comparing the measured resistance value of the conductor to the obtained reference resistance value.

In a further aspect, the first circuit includes a power source and a stored table of reference resistance values each correlated to a given power source output voltage and ambient temperature, the first circuit for measuring the power source output voltage, the ambient temperature and the conductor resistance and for comparing the measured voltage and ambient temperature to the table voltage and temperature values to obtain a reference resistance value, the first circuit for comparing the measured resistance value to the reference resistance value.

In a further aspect, the first circuit is responsive to a command signal, the first circuit including a memory for storage of time/date data and being arranged for periodically transmitting the time/date and tampered status of the cable during that period upon receipt of the command signal.

In a further aspect, the first circuit includes an alarm circuit for generating and transmitting an alarm signal including a data signal manifesting the time/date stamp of the alarm signal upon detection of a tamper condition of the cable manifested by the measured resistance value of the conductor.

In a further aspect, the seal includes an electrical contact arranged to engage the received locked cable free end for arming the first circuit to commence periodically polling and recording the locked status of the cable and associated time/date of the recording.

In a further aspect, the seal includes an arming arrangement responsive to a received arm command signal for arming the first circuit and commencing monitoring the locked cable tamper free status.

In a further aspect, the circuit includes a shut down arrangement for shutting down the first circuit at the end of a predetermined period after the arming of the first circuit.

In a further aspect, the housing includes a first compartment for receiving the cable and a second compartment containing the first circuit, the first and second compartments being hermetically sealed from each other in the cavity, the second compartment being hermetically sealed from the ambient atmosphere.

In a further aspect, the first and second compartments have a common wall, the conductor exiting the cable in the first compartment and passing into the second compartment through the common wall and sealed to the common wall with a hermetic seal.

In a further aspect, the locking device includes an extension, the extension for receiving the cable second end, and a cable securing arrangement for fixedly securing the cable second end to the extension.

In a further aspect, the seal is for securing the door or doors of a cargo container, the door or doors having keeper bars and a hasp, the cable having a length sufficient to secure the keeper bars and hasp.

In a further aspect, the first circuit is electrically connected to the conductor and responsive to the electrical conductivity value of the conductor, the first circuit including a signal generating circuit for sensing the conductivity value of the conductor and for generating a first signal manifesting a cable locked state indicating the cable is locked to locking device and tamper free when the conductor has a first conductivity value and for generating a second signal manifesting a cable tampered condition in response to sensing a change of conductivity of the conductor from the first conductivity value.

In a further aspect, a lid is included for covering the first compartment for sealing the first compartment from the second compartment.

In a further aspect, an RFID tag is associated with the first circuit, the tag for initializing the first circuit to an armed condition in response to a received arm command signal.

In a further aspect, the tag includes a relay circuit for relaying electrical signals containing commands and data to and from adjacent seal tags forming a mesh network configuration.

IN THE DRAWING

FIG. 6 is a side elevation view of the locking member of the locking device of FIGS. 5 and 5a;

Figure 1:
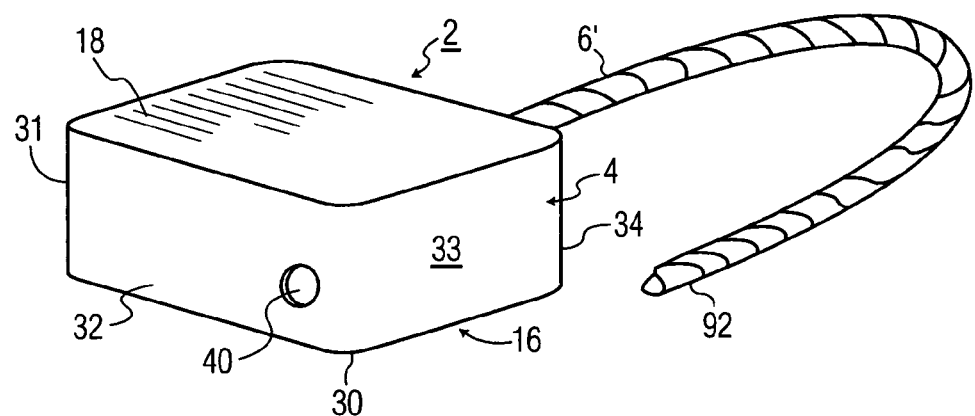
FIG. 1 is an isometric view of an electronic security seal according to an embodiment of the present invention with the cable free end ready for attachment to a hasp.
Figure 2:
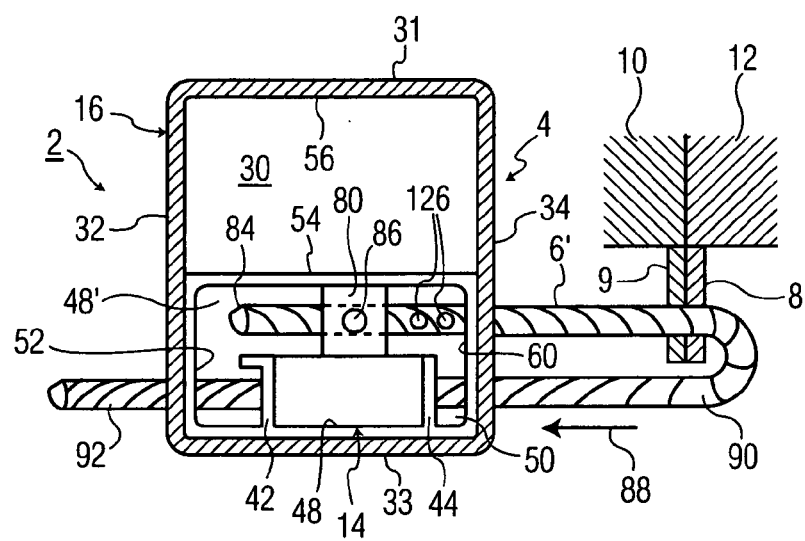
FIG. 2 is a top plan sectional view of the seal of FIG. 1 further including the cable in the locked state attached to a hasp.

In FIG. 1, electronic seal device 2 according to the present invention includes a seal 4 and a stranded electromechanical metal cable 6'. In FIG. 2, the cable 6' is locked to the seal 4 and locks hasps 8, 9 together. The hasps 8, 9 may be part of a cargo container (not shown), for example, for locking a container door 10 shut against a fixed part 12 of the container. The hasps and door are schematic representations as their actual configuration may differ from that of FIG. 2. See, for example, FIGS. 17-19, wherein the hasps are used to secure a handle in place. The handle is rotatable for rotating an attached keeper bar, as explained in more detail later. The cable also may have a length sufficient for wrapping about the keeper bars (See FIGS. 17 and 18, for example) of the cargo container door 10 for retaining the door 10 locked in place. The cable 6' may have a length of several feet or more, for example. The hasps 8, 9 are secured respectively to the door 10 and the fixed part 12 of the cargo container. The cable 6' may also be wrapped about the door handle (not shown) or secured to the handle hasp (See FIGS. 17 and 19).

Figure 4:
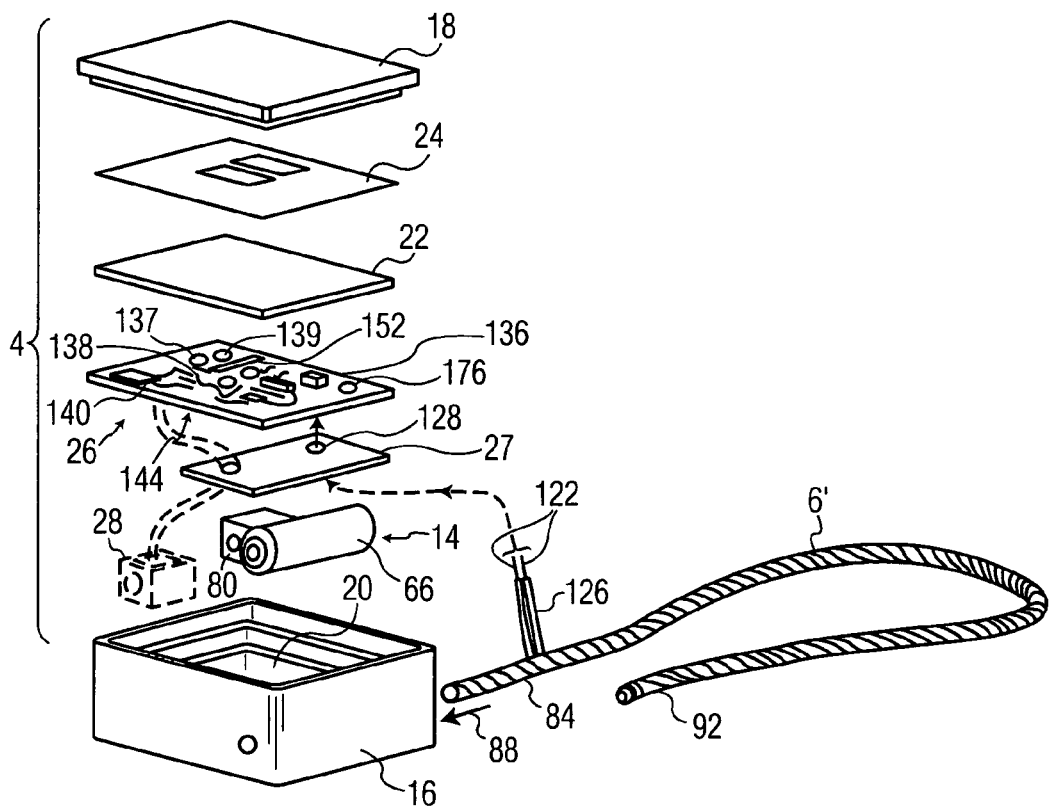
FIG. 4 is an exploded view of the seal of FIG. 1.

In FIG. 2, the cable 6' is attached to a robust locking device 14 that is located inside of housing 16 of the seal 4. As best seen in FIG. 4, the seal 4 comprises a metal die cast housing 16, preferably zinc, but may be other metals or molded plastic materials, such as thermoplastic, according to a given implementation. Attached to and enclosing the open top of the housing 16 is a lid 18 of preferably transparent molded thermoplastic that hermetically seals the cavity 20 of the housing. The lid 18 is attached by bonding, such as with an adhesive or by ultrasonic welding and the like. An optional thermoplastic label support 22, which may be a cut or molded sheet of relatively stiff preferably transparent material, and which may be opaque, is next adjacent to and beneath and visible through the lid 18. The support 22 is also bonded or welded in place and also may be opaque according to a given implementation for the reason to be explained below. A label 24 is attached to the support facing the lid 18 and is visible through the transparent lid. Data may be imprinted on the label or the data may be imprinted directly onto the support 22 substrate or onto the lid 18 in a known manner. The sheet material label 24 may be plastic, metal or paper films. The data that is imprinted is preferably an ID number or code unique to each seal such as a serial number (not shown). The ID data may be in the form of a bar code and preferably is a unique number assigned to each seal. The data also preferably may include the name of the seal manufacturer.

A printed circuit board assembly 26 is beneath the optional label support 22. The circuit board assembly 26 carries the circuit elements which implement the circuit of FIGS. 12 and 13. This circuit performs the steps of FIGS. 14 and 15A and 15B. Beneath the circuit board assembly 26 is a lid 27, which may be thermoplastic. The lid 27 covers the locking device 14, which is beneath the lid 27 and which rests in a compartment 48 (FIG. 2a) between the bottom wall 30 (FIG. 2a) of the housing 16 and the lid 27. Optionally adjacent to the locking device 14 is contact assembly 28 (shown in phantom) which may be used in an alternative embodiment as described hereinafter in more detail in connection with FIGS. 2b and 5a.

Figure 2A:
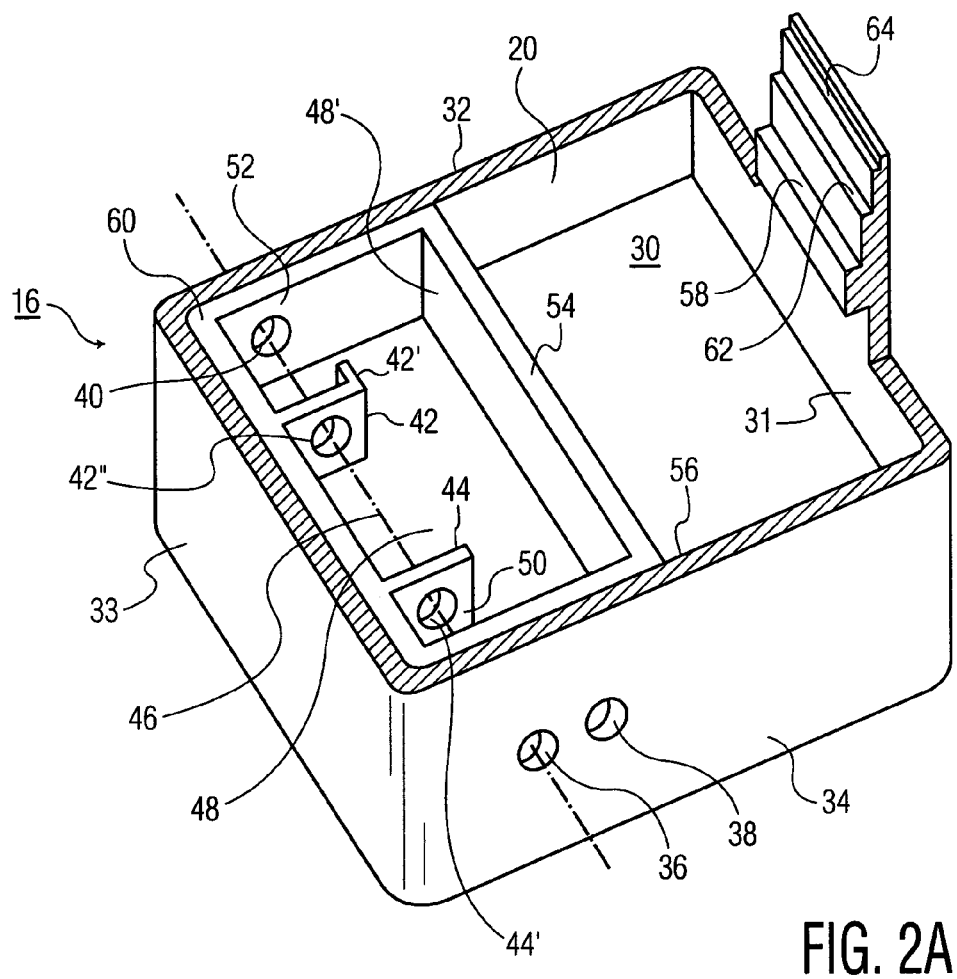
FIG. 2a is an isometric sectional view of the housing of the seal of FIG. 2 without the components inserted.

In FIG. 2a, the housing 16 is shown in more detail and includes bottom wall 30 and four side walls 31-34 extending from the bottom wall, the walls defining cavity 20. A pair of cable receiving apertures 36, 38 are in side wall 34 and a cable receiving aperture 40 is in side wall 32 aligned with aperture 36 on axis 46. Two parallel inner walls 42, 44, normal to and extending from side wall 33, extend upwardly from bottom wall 30. Wall 42 is L-shaped with an L-portion 42'. Walls 42, 44 each have a respective cable receiving aperture 42', 44' and which are aligned with apertures 36 and 40 on axis 46. Walls 42 and 44, side wall 33 and bottom wall 30 define a first compartment 48 in cavity 20 for receiving the locking device 14. Walls 44 and a portion of walls 34 and 33 and bottom wall 30 define a second compartment 50 in cavity 20. A portion of wall 32 and wall 42, a portion of side wall 33 and bottom wall 30 define a third compartment 52, which receives the optional contact assembly 28 (FIG. 5a). Wall 54, a portion of bottom wall 30 and the side walls 32, 34 define a further compartment 48' between compartments 48, 50 and 52 and wall 54. Compartment 48' is an extension of and in communication with compartments 48, 50 and 52 for receiving the locking device 14 and a portion of the cable 6', FIG. 2. Wall 54 in cavity 20 extends partially upwardly from the bottom wall 30 the same extent as walls 42 and 44 and divides cavity 20 into a further compartment 56. All of the walls and the housing 16 are preferably molded one piece die cast zinc.

The upper surfaces of walls 54, 42 and 44 form a continuous ledge. This ledge is coplanar with and continuous with U-shaped shoulder 60 which extends inwardly into cavity 20 from side walls 32, 33 and 34. The walls 54, 42, and 44 and shoulder 60 form a support surface for lid 27 (FIG. 4), FIG. 3. Lid 27, which may be thermoplastic sheet material, is bonded to the upper surfaces of walls 42, 44 and 54 and shoulder 60 to form a hermetic seal therewith over compartments 48, 50 and 52. Thus any moisture that enters these latter compartments via apertures 36, 38 or 40 is precluded from entering the compartment 56, FIGS. 2 and 2a. This sealing of compartment 56 via the lid 27 and lid 18 on shoulder 60 and wall 54, FIG. 4, ensures no moisture or other contaminants are deposited on the printed circuit board assembly 26. Such moisture and contaminants will enter the compartments 48, 50 and 52 via the apertures 36, 38 and 40, FIG. 2a, which apertures are not sealed, with or without the cable 6' inserted therein, FIG. 2. The lid 27, FIG. 4, has an aperture 128 for receiving wire leads 126 from the cable 6'. These leads are hermetically sealed to the lead by any suitable potting material and the like. Thus the circuit board assembly 26 is located in the hermetically sealed portion of the cavity 20 and is protected from ambient atmosphere contaminants such as moisture and so on.

Representative wall 31, FIG. 2a, has in common with all of the upstanding walls 32-34 a continuous lower inwardly facing shoulder 58 on which the circuit board assembly 26 rests. The assembly 26 is attached to the shoulder 58, for example, by fasteners (not shown), by bonding, e.g., adhesive or ultrasonic welding, and so on. The shoulder 58 extends about the cavity 20 and defines a plane above the walls 42, 44 and 54 relative to the bottom wall 30 above the lid 27, FIG. 4.

Spaced above shoulder 58, FIG. 2a, is a second shoulder 62, which like shoulder 60, extends completely around the cavity 20 on all of the walls 31-34. Shoulder 62 receives and supports the label support 22, FIGS. 3 and 4. A third shoulder 64 similarly extends completely around the cavity 20 adjacent to the top upper surfaces of walls 31-34, FIG. 2a. Shoulder 64 receives and supports the lid 18, FIGS. 3 and 4. The lid is sealed to the shoulder 64 by adhesive, bonding or ultrasonic welding forming a hermetic seal therewith. Thus cavity 20 compartment 56 is hermetically sealed from the ambient atmosphere by walls 30, 31-34, 54 and lids 18 and 27.

Figure 5:
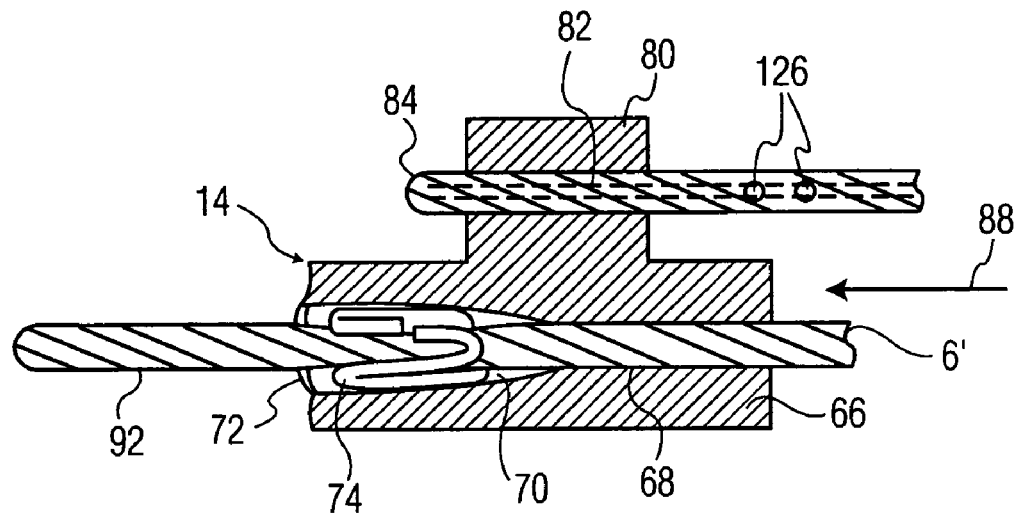
FIG. 5 is a side sectional elevation view of the locking device of the seal of FIG. 1.
Figure 5A:
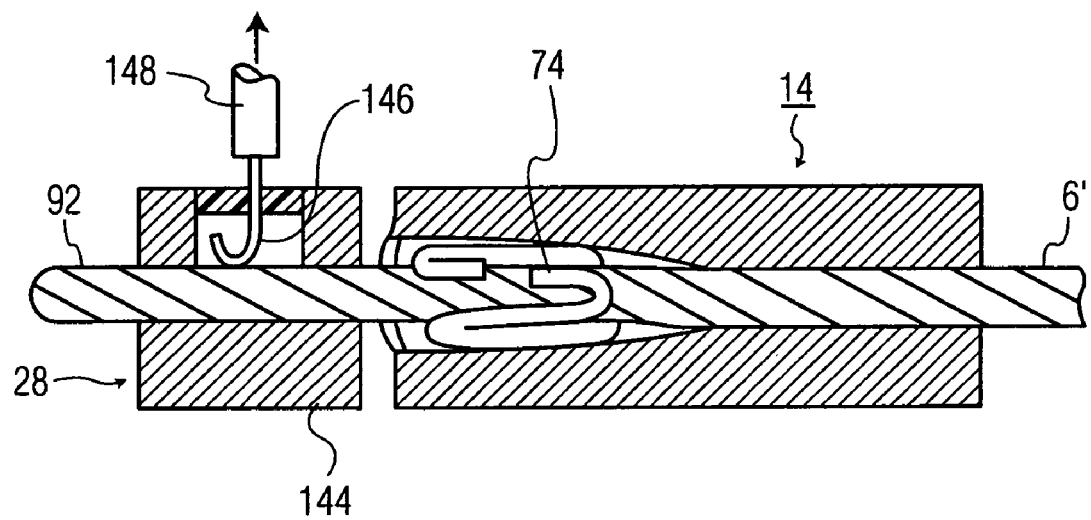
FIG. 5a is a side sectional elevation view of the locking device of the seal of the embodiment of FIG. 3.

In FIG. 5, locking device 14 comprises a robust steel or iron, machined or cast, body 66 having a longitudinally extending cylindrical bore 68 which closely receives the cable 6'. The bore 68 terminates in a tapered bore 70. The bore 70 tapers from a small diameter defined by bore 68 to an enlarged diameter at the opposite end of the bore 70 at end wall 72 of the body 66. Wall 72 is swaged over to enclose the tapered bore 70.

Located within the bore 70 is a locking member 74. Member 74 comprises a length of wire, preferably steel, more preferably stainless steel, circular cylindrical, which is formed into a serpentine shape, FIG. 6. The body 66 and locking member 74 are similar to or identical to a locking body and locking member shown and described in detail in U.S. Pat. No. 5,582,447 mentioned in the introductory portion. Reference is made to this patent for a more complete description of these elements, which patent is incorporated by reference in its entirety herein. The locking member 74 is described in that patent as a clip and whose structure is preferably identical as the clip.

Figure 6:
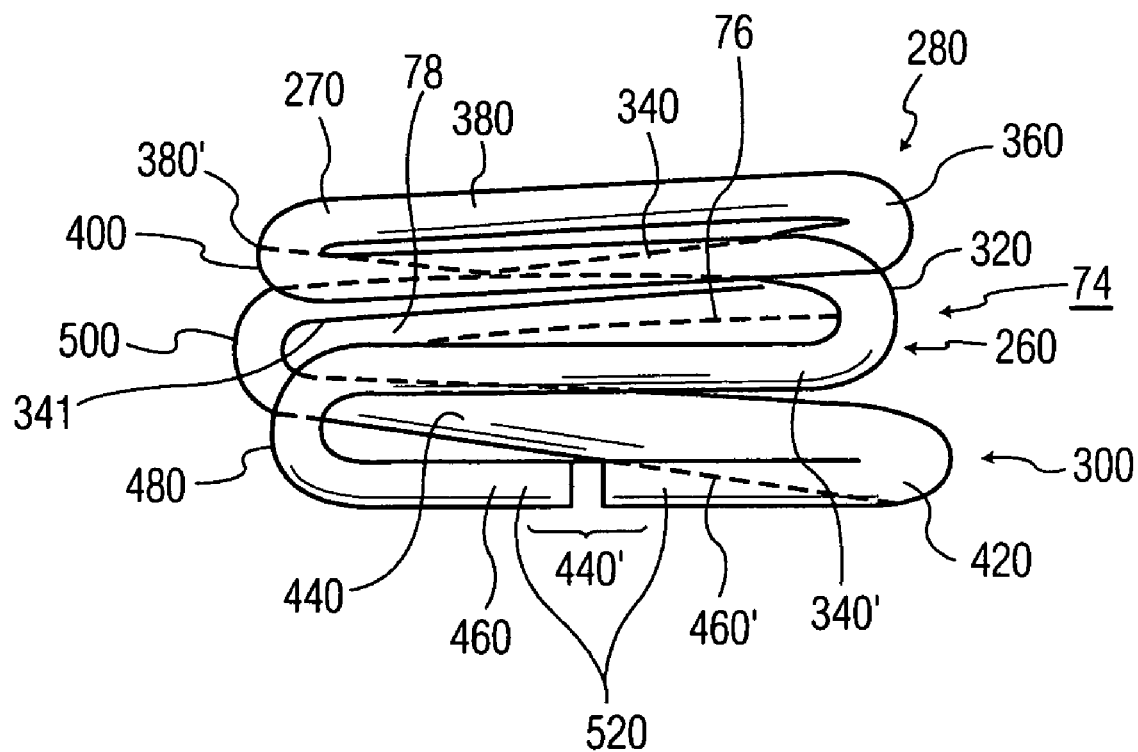
Figure 6A:
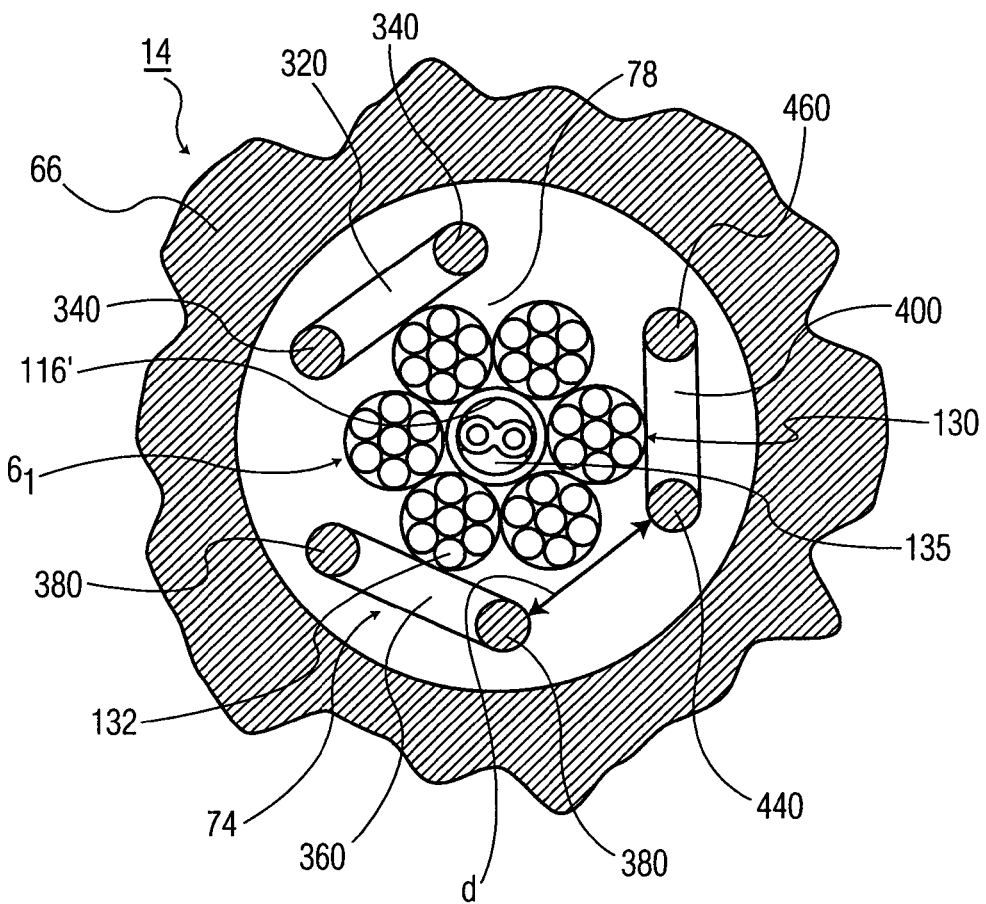
FIG. 6a is a cross section elevation view through the locking member of FIG. 5A.
Figure 6B:
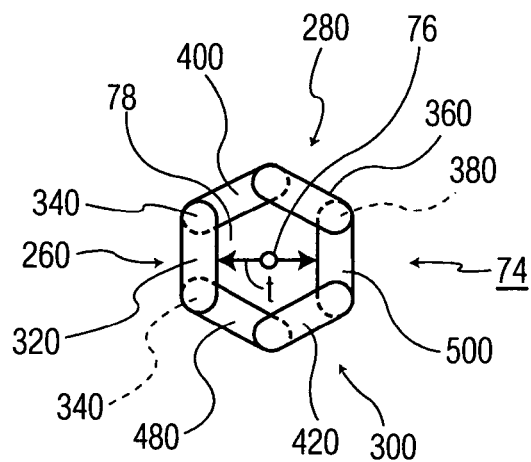
FIG. 6b is an end elevation view of a locking member of FIG. 6.

Briefly, the locking member 74 is hexagonal, FIGS. 6a, and 6b, or circular (not shown) in end view. The member 74 comprises a metal wire, preferably circular cylindrical, bent into the serpentine shape as shown in FIG. 6. The member 74 includes three U-shaped loop members 260, 280 and 300 forming radial resilient axially extending fingers along axis 76. Members 260 and 280 are preferably identical. Member 260 has at one end a circular segment base portion 320. Two preferably linear legs 340, 340' extend from the base portion 320. The legs could also be arcuate in the form of lobes. Member 280 has a circular segment base portion 360 at one end from which two preferably linear legs 380, 380' extend. The opposite ends of the legs 340 and 380 are interconnected with a circular segment end portion 400.

Loop member 300 has substantially the same dimensions and shape as loop members 260 and 280. Member 300 comprises a circular segment end base portion 420 and a pair of linearly extending legs 440 and 440'. Leg 440' is segmented into two end sections 460 and 460' of the ends of wire 520. These sections while spaced essentially form a leg of the member 300. However, the sections 460 and 460' function and cooperate generally as if integral as the one piece legs of he other members 260 and 280.

Section 460 is connected to the leg 340' by circular segment end portion 480. Circular segment end portion 500 connects the legs 341 and 440. All of the legs except legs 440', the base portions and end portions are substantially identical.

The members 260, 280 and 300 are each planar as are the end portions 400, 480 and 500 so as to form a hexagon in end view. The locking member 74 is substantially symmetrical. Symmetry is desired because the locking member can then be inserted into the body 66 bore 70 regardless the member 74 orientation. However, asymmetrical locking members can also be used and these must be inserted into the bore 70 in one relative orientation.

The pitch d of the loop members, FIG. 6a, is important. The pitch is the spacing between adjacent loop members. The pitch is preferably about 1.5 times the diameter of the wire forming the member, which wire is circular cylindrical in this embodiment. The drawing is not to scale. The further apart the loop members for a given wire diameter forming the locking member, the less effective the resilient gripping of the cable $6_1$.

The locking member 74 is radially compressed against the cable 61 inserted into its central open region bore 78 along the entire length of the locking members along its legs and axis 76. This provides the locking member with enhanced gripping action to the engaged surfaces of the cable $6_1$. The radial resilience accommodates a wide range of tolerances and dimensional variations of the cable being secured thereto. The locking member may also be circular in end view. Reference is made to the aforementioned '447 patent for further description of the locking member, various embodiments thereof and the mating lock body configurations which may be used with a given locking member and incorporated by reference herein. Such other embodiments may be used according to a given implementation of the seal herein.

The locking member 74 has an internal transverse dimension t, FIG. 6b, that is smaller than the smallest expected cable 6, 6', or 6$_1$ outer diameter in the tolerance range for that cable. For example, a ¼ (0.250 inch or 6.4 mm) inch diameter cable may have a nominal tolerance of +/−0.020 inches (0.5 mm) or a minimum diameter of 0.230 inches (5.9 mm). The member nominal internal diameter t is smaller than this smaller value. This ensures that the member 74 always resiliently grips the cable regardless its tolerances in diameter, when inserted in the member 74 bore 78, FIG. 6b, along member 74 axis 76.

In FIG. 5, the locking member 74 is first inserted in the bore 70 of the lock body 66 in either of two opposite axial orientations of the locking member due to the symmetry of the locking member 74. Once inserted, the end wall 72 is swaged closed as shown to secure the locking member inside of the bore 70.

While the locking member 74 is described in a preferred embodiment, it should be understood that any available locking device for securing a stranded cable to the seal housing may by used in the alternative.

In FIG. 5, the locking device 14 includes a laterally extending extension 80 which has a bore 82. The bore 82 closely receives end 84 of the cable 6'. The cables 6' of FIGS. 5 and 6$_1$ of FIG. 6a differ somewhat from cable 6' as explained below in more detail, but their operating principles with respect to the locking member 74 is the same. The different cables are shown for purposes of illustration. The cable 6' is preferred for reasons to be explained. The extension 80 is received in compartment 48', FIG. 2b. The cable end 84 is staked to extension 80 by permanently deforming a portion of extension 80 with a depression 86, e.g., FIG. 2.

Figure 17:
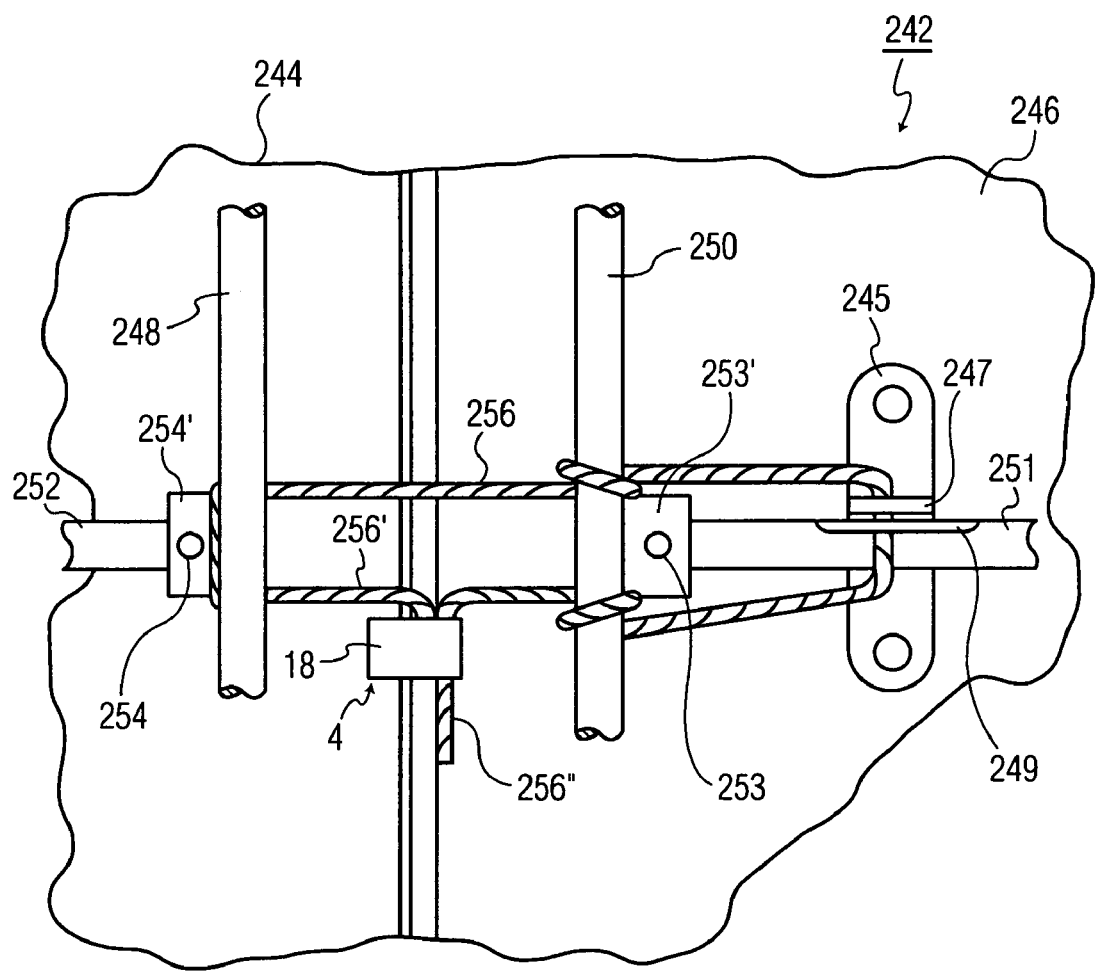
FIGS. 17-19 are elevation fragmented views of a cargo container door showing various sealing arrangements of the keeper bars and handles of cargo containers with a seal according to the embodiment of FIG. 1.
Figure 18:
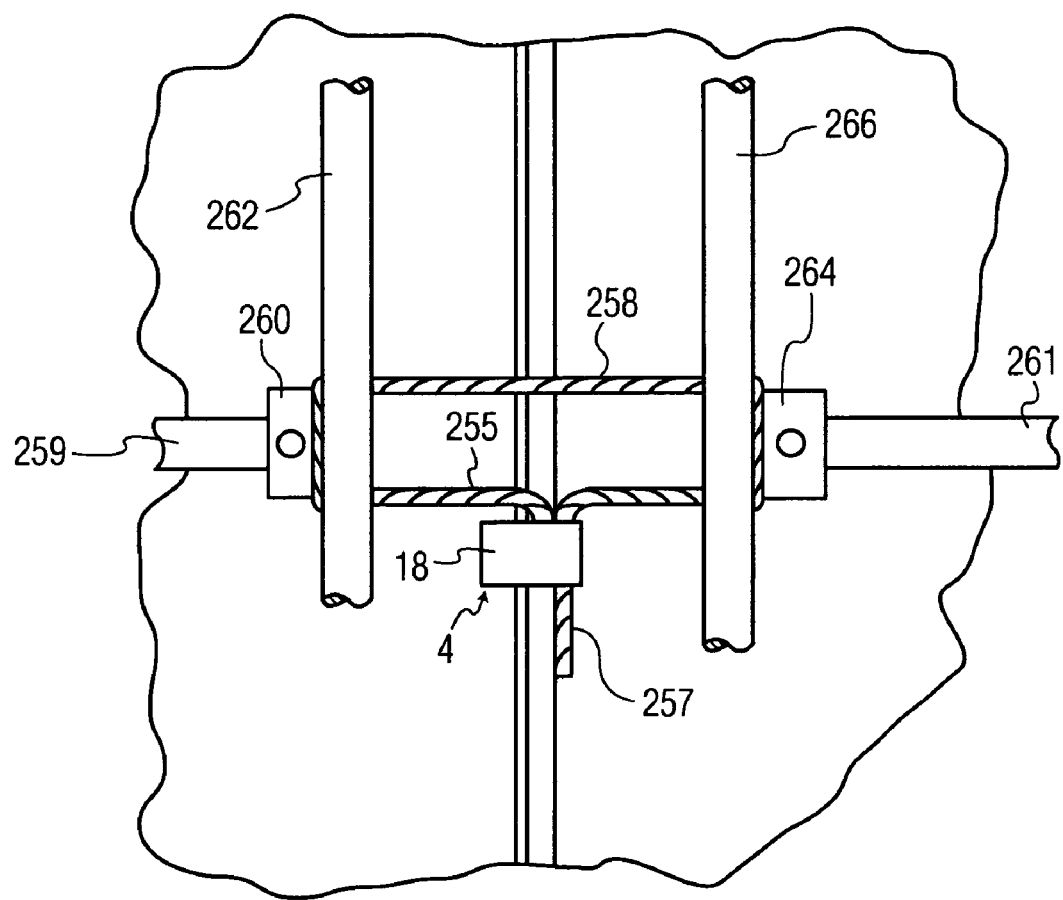
Figure 19:
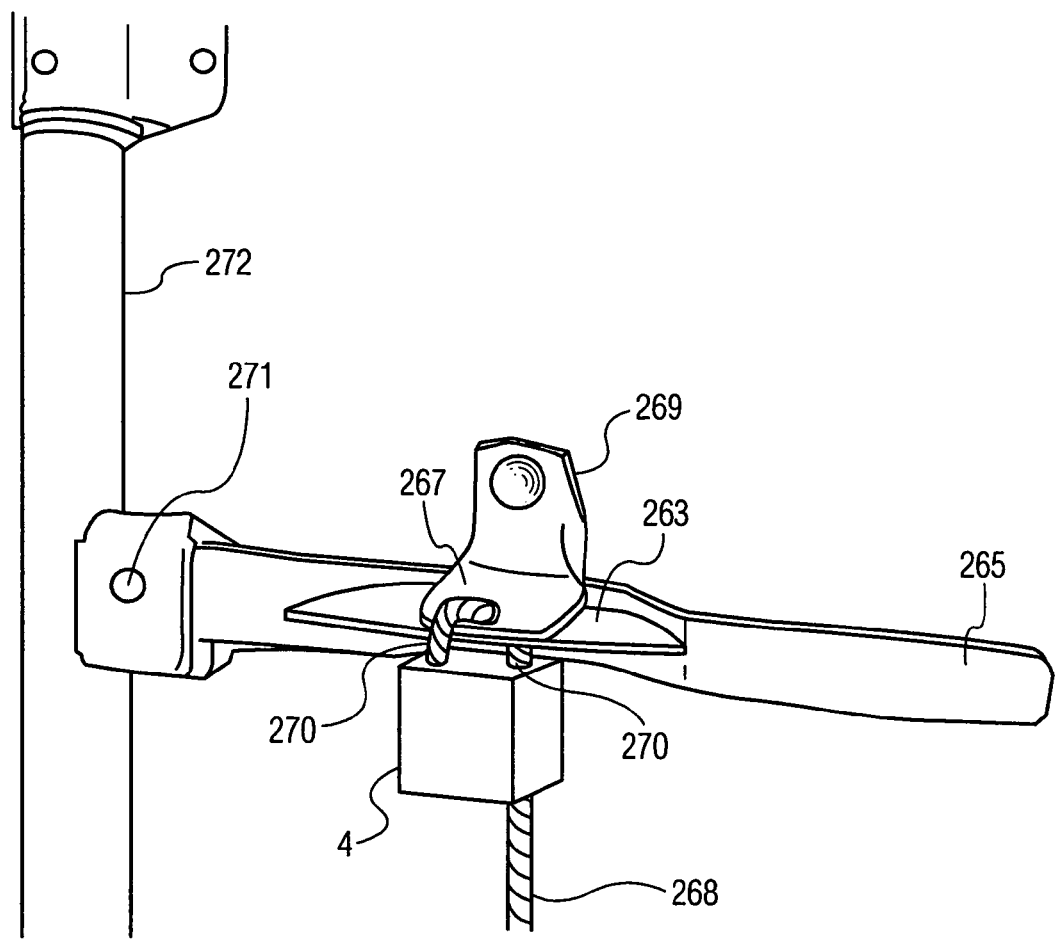

The cable 6' is inserted into the seal 2 in insertion direction 88, FIG. 2. To do this, the cable 6 is passed through the apertures 36, 44', 42' and 40 exiting the compartment 52 and the wall 32 as shown in FIG. 2. The cable 6' may extend beyond the seal housing for any desired length and forms a loop portion 90 of any desired length as the loop portion is tightened about the hasps and/or keeper bars as shown in FIGS. 17-19. As the loop portion is tightened, the locking device prevents the inserted cable 6' from displacing in the opposite direction maintaining the desired tautness in the loop portion. In FIG. 5, the locking member grips the cable 6' as it is passed through the lock bore 70 in direction 88. This gripping pulls the locking member 74 in direction 88 toward the tapered larger diameter of the bore 70. In this region of the bore, the locking member being radially resilient expands sufficiently in the enlarged bore portion by the pushing action of the cable through the locking member 74 bore 70, to permit the cable to be pushed through the locking member bore 78, FIG. 6a. The cable is pushed through an amount so that the loop portion 90, FIG. 2, of the cable is as taut as desired with respect to the hasps 8 and 9, keeper bars or other elements about which the cable may be wrapped.

The cable can not be withdrawn in a direction opposite to direction 88. This is because the locking member always is gripping the cable even when displaced toward and against wall 72, FIG. 5. The gripped cable when pulled in the withdrawal direction opposite to direction 88 pulls the locking member 74 therewith and wedges the locking member against the smaller diameter bore 70 of the lock body 66. This resiliently crushes the locking member radially inwardly against the cable locking the cable to the locking device 14. The more force applied to the cable in the withdrawal direction, the greater the wedging force and thus greater the forces locking the cable to the lock body 66. Thus once the cable free end 92 is inserted in locking engagement with the locking member 74, the cable end 92 can not be withdrawn from the seal 2 without permanently destroying the seal or cable.

Figure 8:
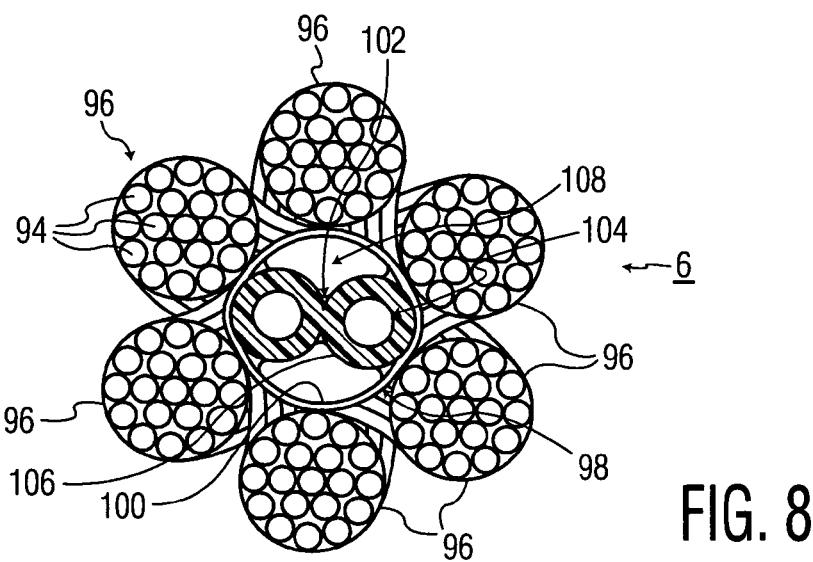
FIG. 8 is an end sectional view of the cable of FIG. 10 taken along lines 8-8.

In FIG. 8, one embodiment of a cable 6 is shown in more detail. Cable 6 comprises galvanized steel strands 94 which are wrapped to form a twisted bundle 96 of strands 94. The cable 6 comprises six bundles 96 of such twisted strands 94. The bundles 96 are wrapped about a central tube 98 having a hollow core 100. The tube 98 may be of any electrically insulating material such as thermoplastic or other materials. The material may also be aluminized mylar sheet material, i.e., an aluminum coating, if necessary, to provide electrical shielding of the wire 104 conductor from stray external electrical fields and the like. The cable 6 strands 94 may be of any gauge. In this embodiment, there are 19 strands to a bundle 96 wherein the cable bundle 96 may be referred to as a 6×19 bundle, 19 strands per bundle and 6 bundles per cable. All of the bundles 96 are preferably identical, but may differ from one another if desired.

Located within the core 100 of tube 98 is a two conductor pair 102 of wires 104. The wires 104 may be 26 AWG copper strands in this embodiment, but can be other gauges according to a given implementation. The wires 104 are encased in optional insulation 106 which may be plastic, e.g., solid or foam, and are used to support the tube 116 as the cable is wrapped about the tube 116. Optionally, the core 100 may be filled with an insulating filler material 108. The wire 104 may be a single loop and is commercially available. It may be stranded or solid. If solid it may be extruded.

Figure 9:
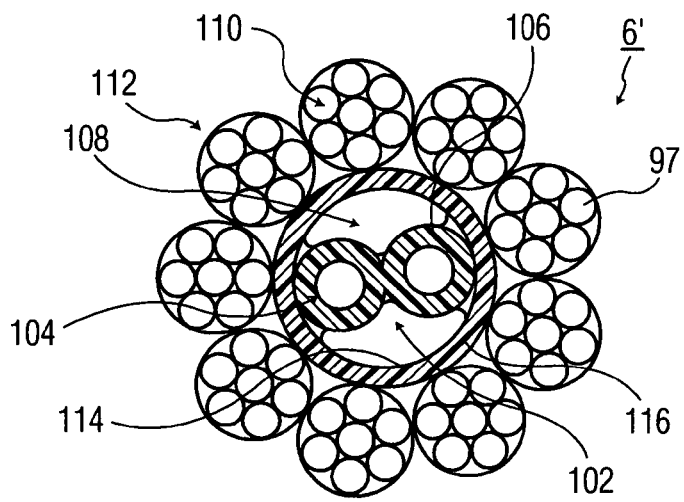
FIG. 9 is an end sectional view of the cable of FIG. 7 according to a second embodiment taken along lines 9-9.

In an alternative embodiment, FIG. 9, cable 6', which is preferable for use in the disclosed seal of the present embodiment, comprises nine bundles 112 of seven strands 110 of 26 gauge galvanized steel wire 97, which bundles form a hollow core 114. A thermoplastic tube 116, preferably PVC, is located in the core 114. Located inside the core 114 and tube 116 is two conductor pair 102 of wires 104. The wires 104 may be 26 AWG copper strands in this embodiment, but could be other gauges or solid as discussed above according to a given implementation. The wires 104 are encased in insulation 106. Optionally, the core 100 may be filled with an insulating filler material 108 as discussed above for the embodiment of FIG. 8. The cables 6 and 6' may be about 1.5 meters or any other length as suitable for a given need as discussed below in connection with FIGS. 17-19.

Figure 7:
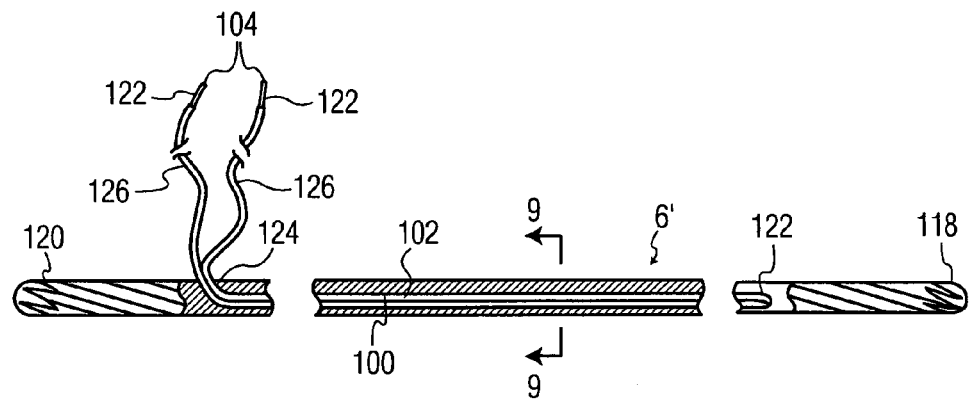
FIG. 7 is a plan view partially in section of the cable showing the conductors inside the cable core employed in the embodiment of FIG. 1.
Figure 7A:
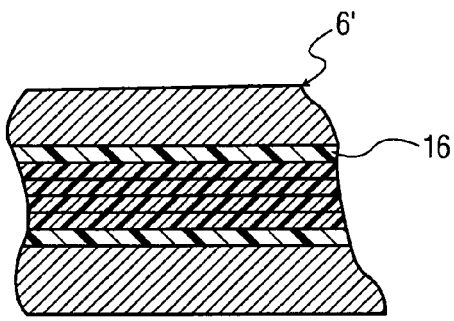
FIG. 7a is a more detailed fragmented sectional view of a portion of the cable of FIG. 7 showing the tube and conductors inside of the tube.

In FIG. 7, cable 6' according to this embodiment has one end 118 that is swaged, fused or welded closed to seal the core 100 at that end. The wire pair 102 comprising a single wire 104 terminates in a loop 122 about 2.5 cm or less from the tip of the end 118. The loop in the alternative may be formed by a splice at one end of two parallel wires 104. The wire pair 102 is thus formed as a loop of a single or spliced wire 104 conductor having opposite exposed adjacent bared wire ends 122. The wire pair 102 exits the cable core 100 adjacent to, but spaced from, the opposite second end 120 of the cable in an opening 124 in the side of cable 6'. The leads 126 of the wire pair 102 exiting the opening 124 may be several centimeters, e.g., 5-7 centimeters, long according to a given implementation. The wire bared ends 122 are attached to the circuit 138 of circuit board assembly 26, FIGS. 3 and 4.

Figure 3:
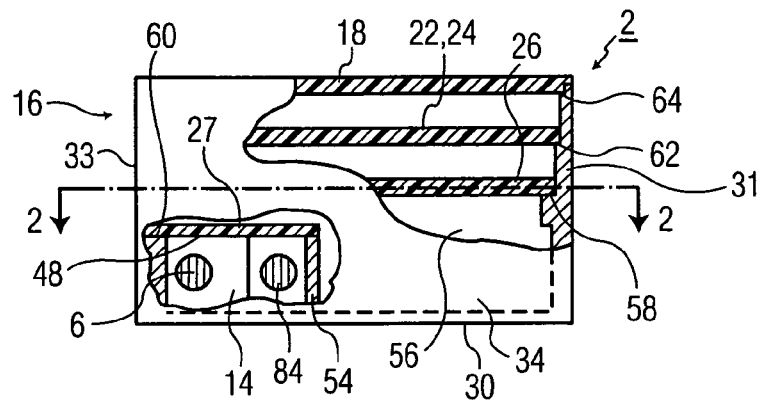
FIG. 3 is a side elevation partially in section view of the seal of FIG. 1 with the cable inserted and locked in place.

In FIG. 2, the wire leads 126 exit the cable 6' in the compartment 48' and are electrically connected to the circuit 138 on circuit board assembly 126 in compartment 56. In FIG. 4, the leads pass through aperture 128 in lid 27 into compartment 56 (FIGS. 2a and 3). The leads 126 are then sealed to the lid 128 by a suitable epoxy or potting material as described previously. This potting material hermetically seals the compartment 56 (FIG. 2a) containing the circuit board assembly 126. This seal prevents moisture and other contaminants that might be present in the ambient atmosphere from attacking the circuit board assembly 26 via the cable apertures 36, 40 (FIG. 2a) and compartment 48 in the seal housing 16 as noted above. That is the compartments 48, 48', 50, and 52 of the housing receiving the cable 6, 6' or 6" is open to the ambient atmosphere and thus is subject to moisture contamination as discussed herein. The bared ends 122 of the wires of leads 126 are soldered or otherwise connected to the circuit of circuit board assembly 26 in compartment 56 (FIGS. 2a and 3).

Figure 10:
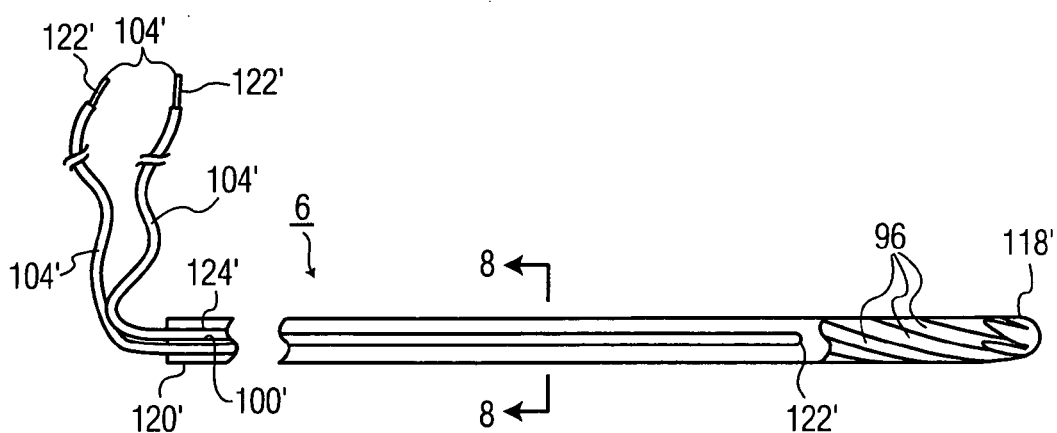
FIG. 10 is a plan view partially in section of the cable showing the conductors inside the cable core employed in a further embodiment.

The location of the leads 126 relative to the extension 80, FIGS. 2 and 5, is important. The leads 126 exit the cable 6' prior to the entrance of the cable 6' in the extension 80, FIGS. 2b and 5. In this way the leads 126 are not deformed or damaged by the staked depression 86, FIG. 2, in the extension 80, which depression may deform the cable 6'. In this way the resistance of the wire 104 is not changed after the staking operation of the cable 6' to the extension 80. This is important as it may be desirable to measure the resistance of the wire 104 to calibrate it to voltage and temperature variations as described hereinafter prior to installation of the cable 6' to the seal extension 80. Possible damage to the wire 104 might cause its resistance to change in an unknown manner later, such as due to crushing, twisting action and so on as might occur during or after staking. For this reason the embodiment of the cable 6", FIG. 10, is not preferred wherein the wire 104' would possibly be damaged when the cable 6" is staked to the extension 80 of the locking device 14. However, this embodiment is preferred in the interest of saving manufacturing cost so that there is a trade off as to when resistance should be measured in the wire 104, prior or subsequent to installation to the lock extension 80. If the embodiment of FIG. 10 is used then the resistance of wire 104 is calibrated after installation.

Of course where the cable end is secured to the locking device 14 by other than staking at the cable end 120', such as by the use of a second locking member 74 as illustrated in the '447 patent FIGS. 7-10 for example, in an alternative embodiment, then cable 6" is also a preferred embodiment.

In FIG. 10, cable 6" according to a second embodiment has one end 118' that is swaged, fused or welded closed to seal the core 100' at that end. The wire pair 102' terminates in a loop 122' about 2.5 cm or less from the tip of the end 118'. The wire pair 102' is thus formed as a loop of a single wire 104' conductor having opposite exposed adjacent bared wire ends 122'. The wire pair 102' exits the core 100' at the opposite second end 120' of the cable in an opening 124' in the end of cable 6". The leads 126 of the wire pair 102 may be several centimeters, e.g., 5-7 centimeters, long according to the implementation. The wire bared ends 122 are attached to the circuit of circuit board assembly 26, FIGS. 3 and 4.

As shown in FIG. 2, the wire leads 126 exit the cable 6 in the compartment 48'. This location prevents damaging the wire leads by the stake depression 86 in the extension 80. In FIG. 4, the leads 126 pass through aperture 128 in lid 27.

The leads 126 are then sealed to the lid 128 by a suitable epoxy or potting material. This material hermetically seals the compartment 56 (FIG. 2a) containing the circuit board assembly 126. The bared ends 122 of the wires of leads 126 are then soldered or otherwise connected to the circuit of circuit board assembly 26 in compartment 56 (FIGS. 2a and 3).

In the embodiment of FIG. 6a, the cable $6_1$ may be formed of the same gauge wires as discussed above for the embodiments of FIGS. 7 and 10, for example. The cable $6_1$ however, is formed of six bundles 130 of wire strands 132 with 7 strands per bundle. A thermoplastic tube 116' is inside the core 134 of the cable $6_1$. A wire pair 102 is located inside the core and tube 116'. Otherwise the cable $6_1$ is substantially the same as cable 6', the outer diameters being determined for a given seal implementation and may differ among different embodiments of any of the cables or among the different cables.

The circuit of printed circuit board assembly 26 (FIG. 4) comprises a circuit board 136 with a programmable circuit 138, shown in more detail in FIG. 12, comprising a microcontroller CPU, controller 150, as hereinafter referred to, i.e., a computer processing unit, one or more memories 152. The circuit 138 includes other circuit components 144 such as crystals, capacitors and resistors and conductors and so on for providing a programmable transmitting seal command control circuit and an RFID tag circuit 170, FIG. 12. The tag circuit 170 includes its own controller 172, FIG. 12, which may be a micro controller. The term micro-controller refers to conventional integrated circuits, which form a control circuit. The latter tag circuit is somewhat similar to the circuit 218 of FIG. 11. It may also be similar to the circuits described in certain of the patents noted in the introductory portion incorporated by reference herein and modified as described herein. The memory(s) may be volatile or read only. The memory(s) are preprogrammed into a memory chip and/or programmed by radio transmission into a programmable memory via its receiver. The data programmed into the memory 152 may include some or all of the following: a seal identification code, i.e., a unique number (a serial number) assigned a particular seal, geographic location where the seal is being deployed, e.g., if a port, the port of origin of the container to which the seal is attached, container identification, e.g., a unique number assigned to a cargo container, the shipping carrier for the container, container destination, inventory of the container and other data. Such a programming circuit is within the skill of one of ordinary skill in the computer programming art. The circuit 138 is connected to the conductor terminal ends of the leads 126, FIGS. 4 and 7, to the cable 6' wire pair 102 (FIG. 7) which completes the circuit. The circuit may be armed by a radio transmission received by the tag 170 from an interrogator 158, FIG. 12 for example, using an encrypted password.

Figure 2B:
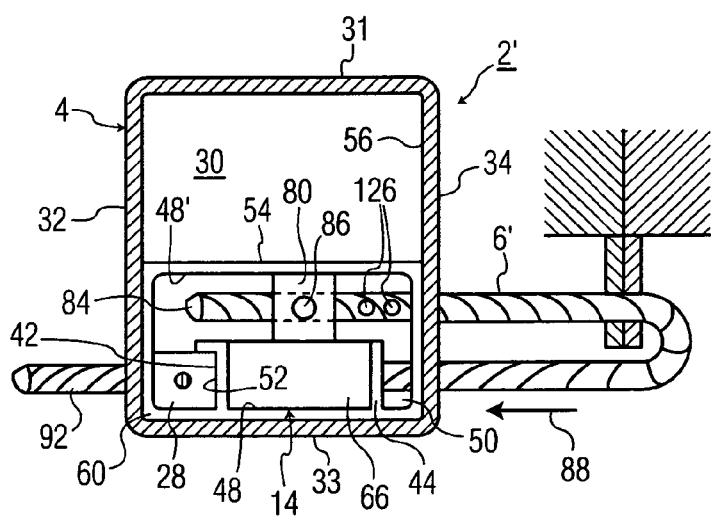
FIG. 2b is a top plan sectional view of the seal of FIG. 1 further including the cable in the locked state attached to a hasp according to a second embodiment.

In the alternative, in the embodiment of FIG. 5a, a contact assembly 28 may be included which comprises a connector element 144, which includes either a metal or thermoplastic block, and is inserted in compartment 52, FIG. 2b. In FIG. 5a, the assembly 28 includes a resilient contact 146, e.g., beryllium copper, connected to the circuit 138 by wire 148 for arming the circuit 138 by closing an ohmic connection to the circuit 138 arming circuit portion as depicted by the arm step 168, FIG. 14. The armed state indicates that a cable is received and locked to the locking device 14. The end 92, FIG. 5a, of the cable 6' can not engage the contact 146 until the end has passed through the locking member 74 and the cable 6' engaged in a locked state with the locking member 74. The contact 146 is J-shaped as shown, but may be S-shaped or any other shape with a resilient bent contact leg. The contact 146 only engages the cable outer surface during cable insertion after the cable 6' is locked.

However, in the embodiment of FIG. 5, the cable 6' does not engage a contact when inserted into the locking device 14 for locking engagement therewith. In this case, the circuit 138, FIGS. 4 and 12, is armed by remote transmission to the RFID tag 170 associated with the circuit 138 from the reader/interrogator 158 (FIG. 12).

Figure 11:
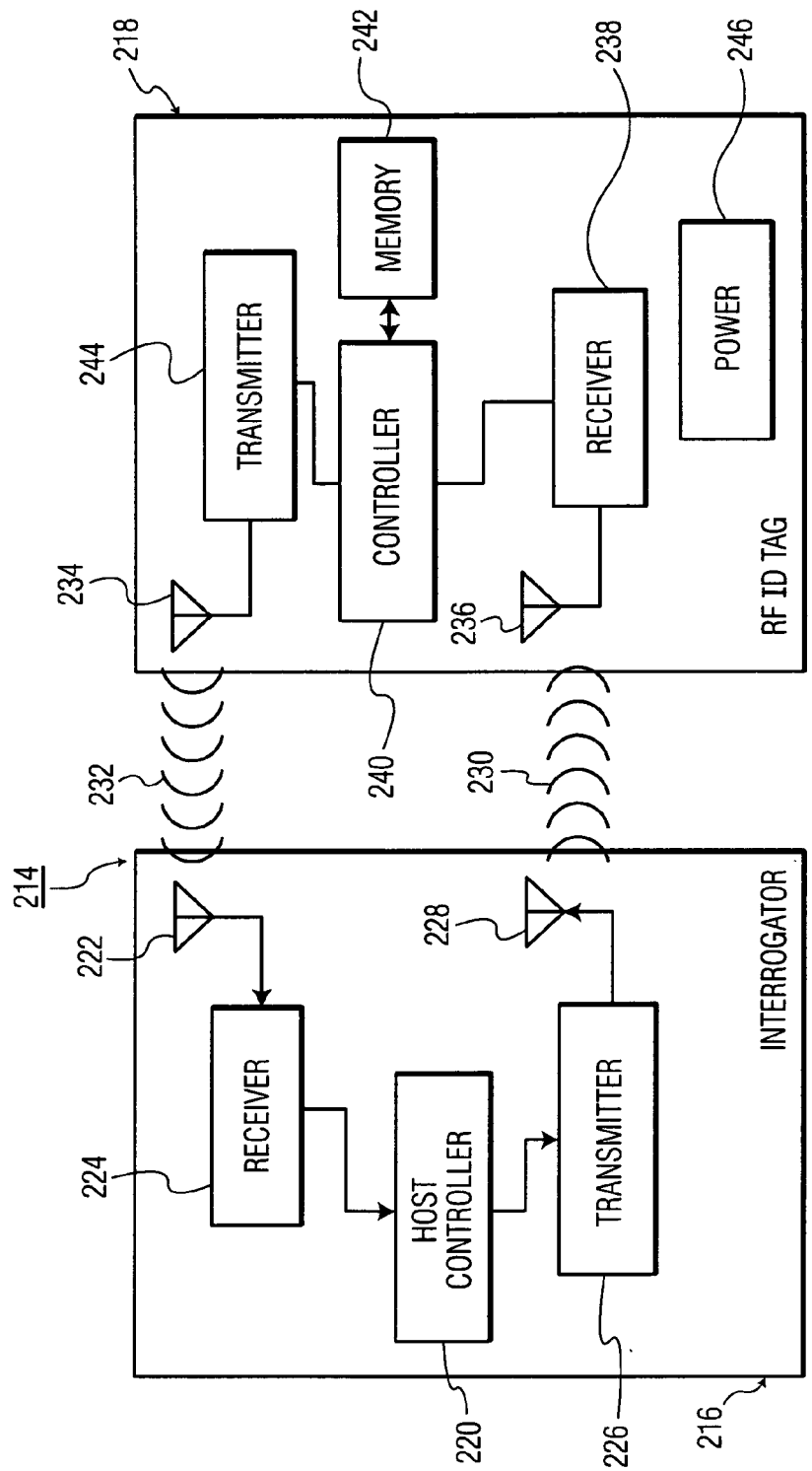
FIG. 11 is a block schematic diagram of a prior art RFID interrogation and tag system.
Figure 12:
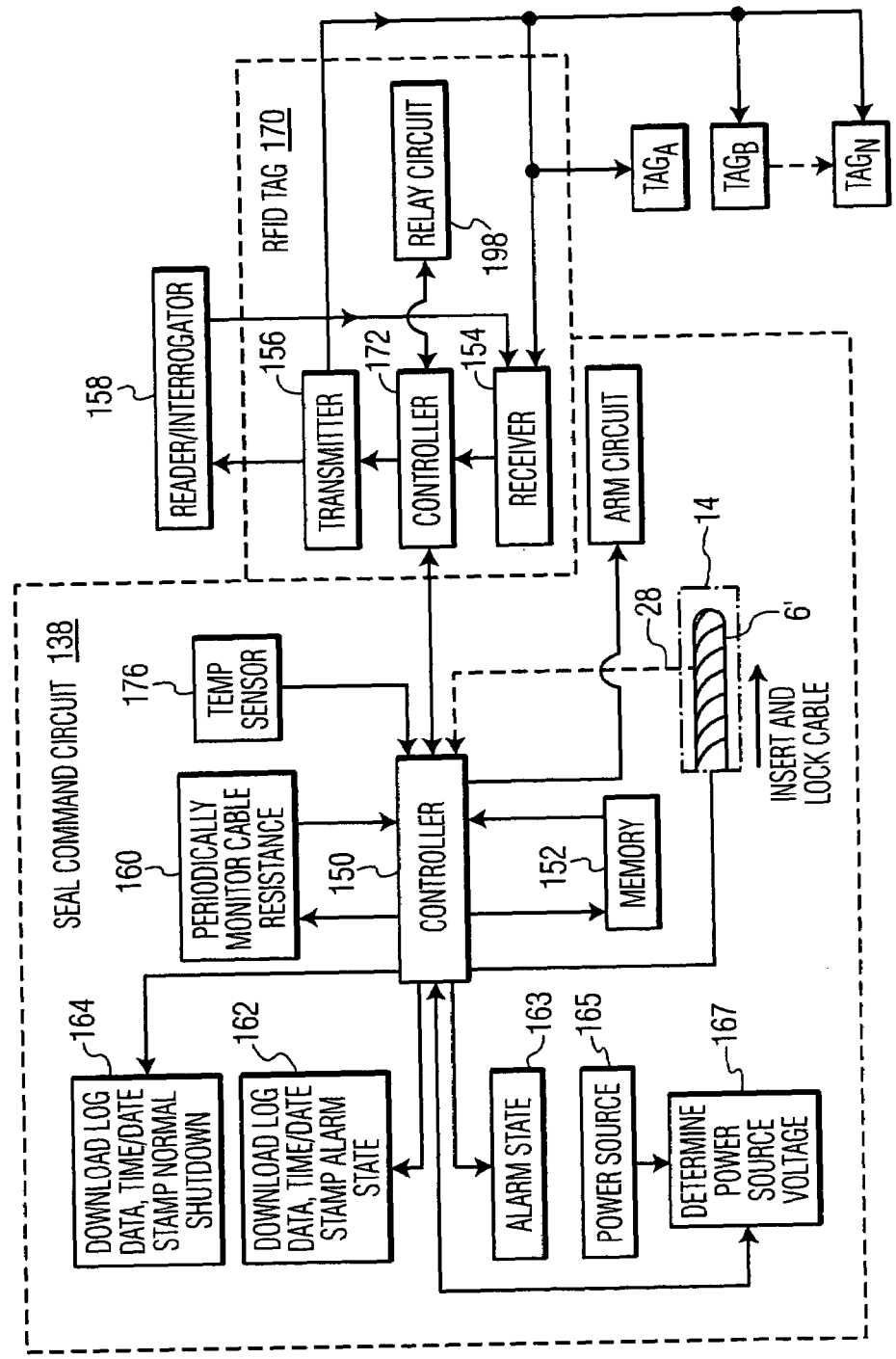
FIG. 12 is a schematic block diagram of an embodiment of a circuit for use with the seals according to the respective embodiments of FIGS. 2 and 2b.

FIG. 12 illustrates in block diagram form the circuit 138, FIG. 4. The contact assembly 28 (FIG. 5a) is shown in phantom in FIG. 12 as an alternative method to arm the circuit after the cable 6' is locked to the locking device 14. In FIG. 12, the circuit 138 includes a seal command controller 150 which includes a CPU (central processing unit, i.e., a specialized computer). Controller 150, which may be a 4 bit RISC MCU (microcontroller), may comprise any available programmable control circuit that is widely available. Controller 150 is programmed to perform the functions described in connection with FIGS. 13-15A and 15B. The programming circuitry includes both volatile and non-volatile memory, such as memory 152 which may include both ROM and RAM. The controller 150 receives transmissions via tag 170 controller 172 and the tag 170 receiver 154. The tag 170 may have similar circuits as RFID tag 218, FIG. 11. The tag 170 transmits signals via its controller 172 and transmitter 156. The transmitter 156 transmits its radio signals to reader/interrogator circuit 158 such as circuit 216, FIG. 11, upon request from the circuit 158 or upon control of controller 150. Of course, the circuit 216 in reader/interrogator circuit 158 is modified by programmed instructions that perform according to the functions described herein below.

Figure 13:
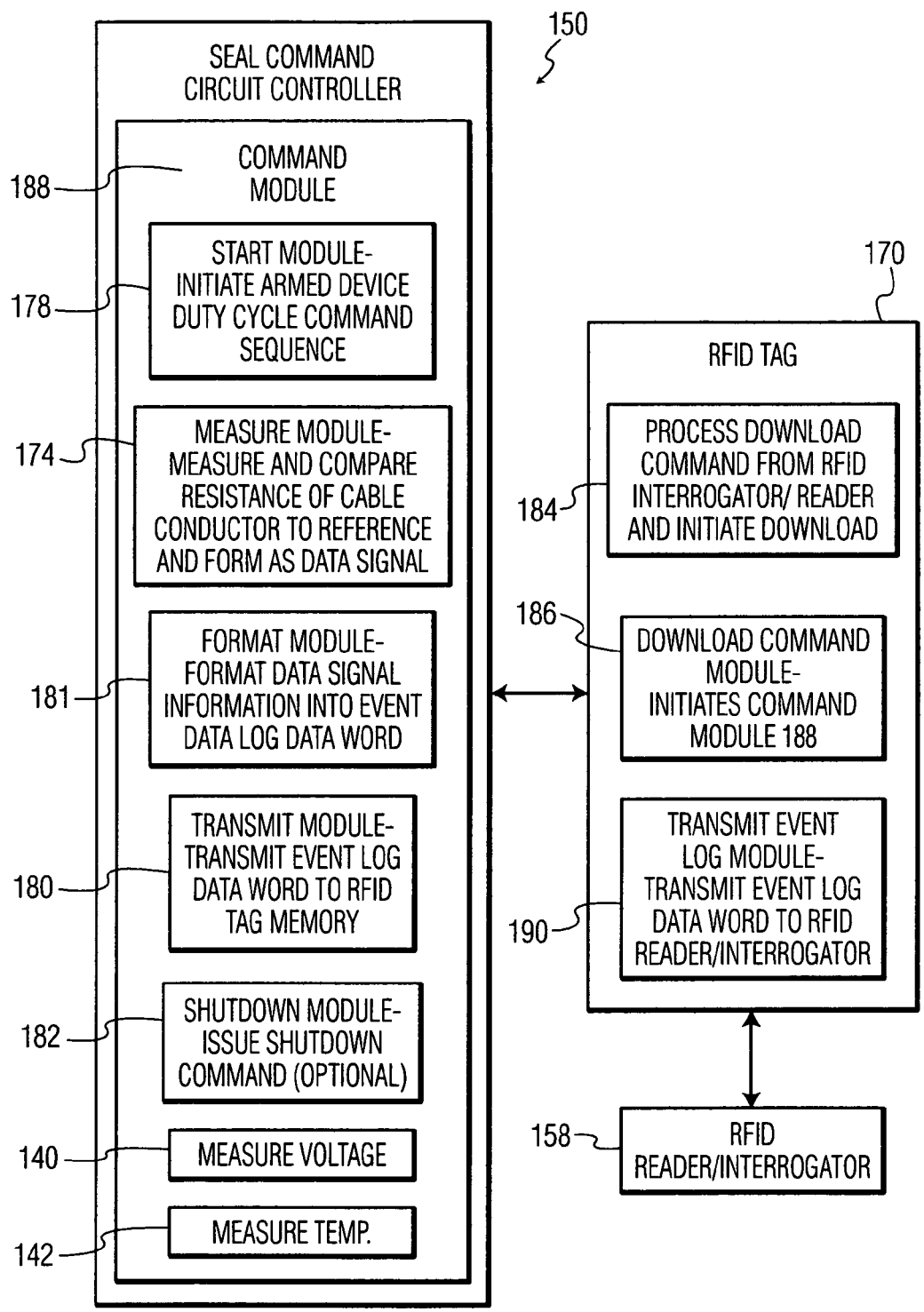
FIG. 13 is a diagram showing the functions of the seal controller and tag of FIG. 12 in more detail.

The controller 150 is programmed to include commands manifested by circuit modules 140, 142, 174, 178, 180 and 182, FIG. 13. Module 174 periodically measures the resistance R of the tamper indicating wires 104 (FIG. 7) inside the cable 6' core (or any other cable used therewith) via resistance R measuring circuit 160, FIG. 12, of circuit 138. This resistance R is calibrated for the particular cable wire 104 length used for a given seal and preferably for temperature and voltage level of the power source 165. Power source 165 may be a 3 volt lithium ion battery optionally supplemented with a solar cell to provide auxiliary power via a trickle charge to the battery. (The module 188 includes a measure voltage control 140 for determining the power source voltage 167 (FIG. 12) and a measure temperature control 142 for periodically measuring ambient temperature via sensor 176 (FIGS. 4 and 12). Module 174 determines the measured resistance R from circuit 160, the measured voltage from circuit 167 and the temperature from sensor 176 (FIG. 12). The module 174 then compares these values to a reference R value corresponding to the measured temperature and voltage values in a stored table (not shown) in memory 152.

The calibration of the resistance R of the cable sensor wire is provided by a table (not shown) stored in memory 152, which may be a flash memory module as commercially available and commonly used in digital devices. This table comprises resistance values R, measured in micro-ohms (as the wires 104, FIG. 7, are excellent electrical conductors) calibrated for the given length of wire in the cable 6' associated with the seal 4 (FIG. 1) for real time measured ambient temperature and battery voltage (power source 165, FIG. 12).

The various different seals preferably are provided with cables of standardized lengths associated with corresponding applications, such as for use with keeper bars alone, keeper bars and hasps together or hasps alone, as may be desired for a given implementation. The wires 104 are standardized in gauge for the seals and thus in resistances R to provide predetermined resistances for each cable diameter and length, which may vary for different seals of different sizes intended for different end uses.

A preferred wire 104 is according to US Military Specification MIL-W-16878E (type ET) Hook Up Wire, TFE Teflon Insulation, either stranded or solid conductors, and is available in numerous gauges.

In FIG. 13, seal command controller 150 includes a command module 188. The command module 188 comprises a start module 178, a measure module 174, a format module 181, a transmit module 180, a voltage measuring circuit 140 and a temperature measuring circuit 142. The start module initiates the armed duty cycle command sequence and initiates the data signal format module 181. The module 178 also initiates the wire 104 R measure module 174 which controls the measuring of the wire resistance R by circuit 160, FIG. 12. The R value is determined based on the stored table discussed above. The format module 178 formats a data word signal from the measured R into an event log data word, e.g., date/time stamp, unique seal ID number, and condition of wire 104, tamper or good, into RFID tag 170 memory (not shown in FIG. 12).

Optionally, depending upon whether the seal is provided with a predetermined automatic shut down mode, a shut down module 182 may be included. This module issues a shut down command to the circuit 138 to shut down the circuit, step 218, FIG. 14, upon receipt of a shut down command (preferably including a password associated with the tag 170) from the interrogator 158, FIG. 12, or at the end of the predetermined X days of operation of the circuit, e.g., 70 days. This shut down, step 230, FIG. 14, occurs after the command module 188 via module 178 causes a data word log event (or trail of events recorded over the entire period the seal has been armed) to be transmitted to the reader/interrogator 158 from the tag 170, step 214, FIG. 14, prior to shut down on receipt of a shut down command from the interrogator 158. Shut down may be initiated for example at any time prior to the 70$^{th}$ day from start up by a program in module 178, by receipt of an external command or automatically at the end of this period, if desired.

If the seal is monitored hourly, as is preferred herein for containers transported by ship between ports, the circuit 138 may optionally be automatically shut down at the end of 1680 hours of active armed mode (70 days) by the program of module 182, FIG. 13, as may be desired for a given implementation. This shut down action occurs at this time provided no fault has occurred in the interim or no active shut down command is received from the interrogator 158. The transmit module 180 transmits the event log data word to the RFID tag memory (not shown in FIG. 12), which can be later downloaded (transmitted externally) upon receipt of a download command.

After assembly to the cable, the wires 104, FIG. 7, of predetermined lengths are tested to be sure they are in a predetermined resistance range at a given temperature, e.g., room temperature, within a desired preset temperature range such as +/−1° F. to +/−n, for example, for each possible voltage range of the battery as the battery power, power source 165, FIG. 12, drains over time. The battery has a life of about 4-5 years and when operational at least about 70 days, which includes a safety factor in excess of the maximum expected time period in which cargo containers carrying the seals are in transit, e.g., up to about several weeks.

As the battery runs down, the voltage output will change, i.e., decrease. The voltage level of the battery, power source 165, FIG. 12, is determined by programmed circuit 167 during a read resistance cycle initiated by controller 150 via module 160, FIG. 12 and modules 140 and 174, FIG. 13. The temperature of the ambient is initiated by modules 142 and 174, FIG. 13 and temperature sensor 176, FIG. 12. The cyclically measured voltage and temperature are used to determine the R value of the wire 104 from the table of temperatures (T) and power source voltages (V) stored in memory 152, FIG. 12. The received electrical voltage signal from the wire 104 is first converted from an analog to a digital format by an ADC (analog to digital converter) circuit (not shown) located in the cable signal monitoring module 160. At about the same time the temperature of the ambient is measured by the temperature sensor 176, FIG. 12.

The measured resistance R of the cable wire 104, which forms a tamper evident sensor for the cables 6 or 6', may vary with the actual voltage output of the battery source 165, FIG. 12, as well as in response to temperature shifts in ambient temperature sensed by sensor 176 and measured by module 142, FIG. 13.

Figure 15A:
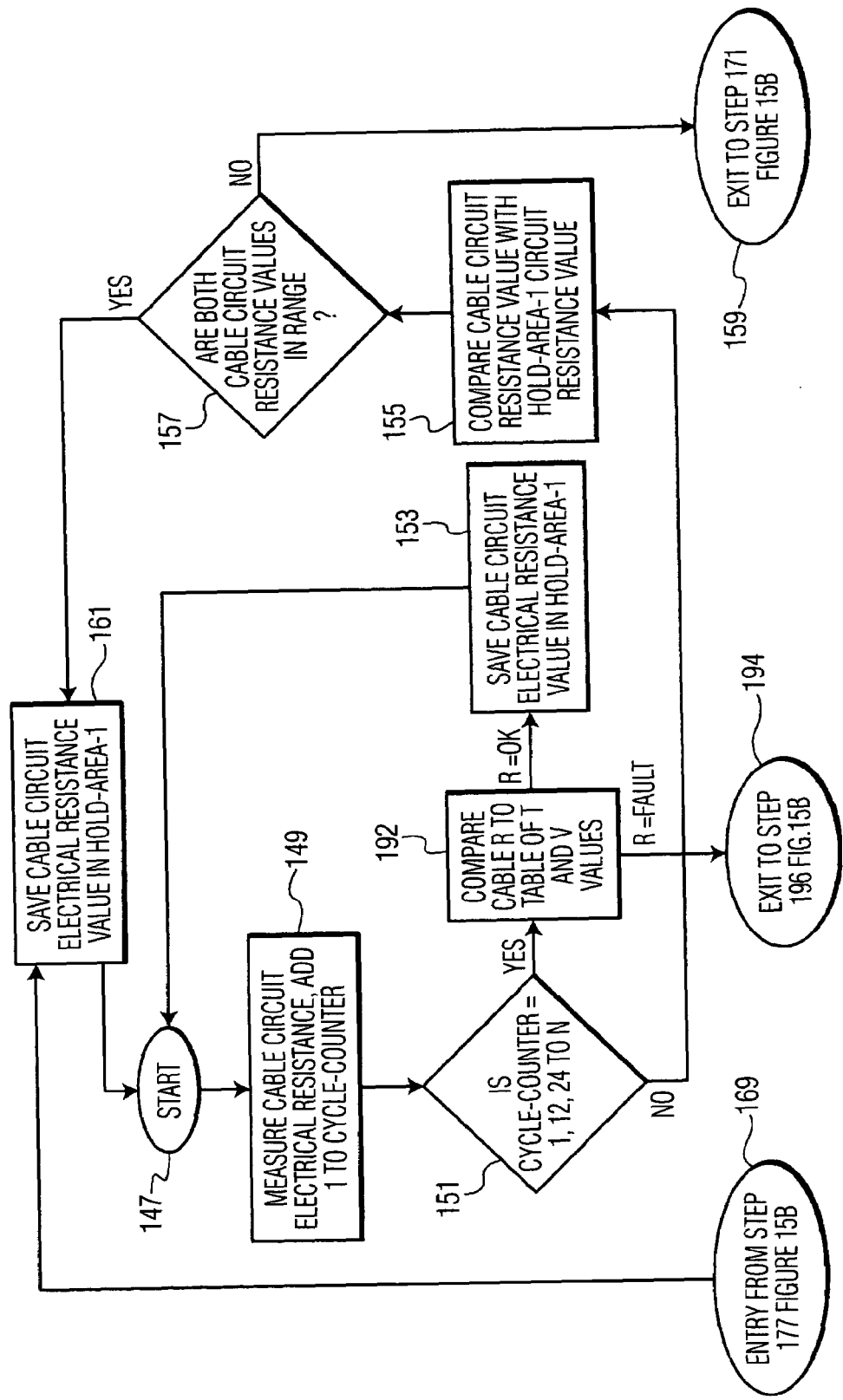
FIG. 15 is a flow chart showing the resistance measuring portion of the circuit of FIG. 12.

Preferably the table of temperature T and voltage V values correlated to the R values of a good wire 104 stored in memory 152 is referred to at the first R measurement of the wire 104, step 149, FIG. 15A, and then is periodically referred to after a number of hourly cycles has passed, step 151, FIG. 15A. The period in which the table is consulted by the controller 150 is preferably twice daily, or every 12 hours, or 12 hourly cycles, so as to verify that the measured R value corresponds to the corresponding acceptable R value in the table of T and V values.

For example, the initial R value of the wire 104 is compared to the table in memory 152 at the initial R measurement step 192, FIG. 15A. This step is indicated by the cycle counter=1, i.e., the first measurement made, step 151, after the circuit 138 is armed step 168, FIG. 14. This step follows the initial action of insertion of the cable into the locking device 14, FIG. 4, at step 200, FIG. 14.

The R values are measured on an hourly basis in the preferred embodiment. This cycle time however, may differ for different embodiments, and may be more or less frequent.

If the measured R is good, i.e., R matches the referred to table value (or predetermined range of values) for the measured voltage and temperature at that time, the value R is saved in a memory location referred to in FIG. 15A as hold-area 1, step 153, which has a specific address in the memory 152 (FIG. 12). Then the process returns, after cycle count 1, to the Start step 147, FIG. 15A. In these subsequent steps the present measured R is compared to the prior measured R value, step 155, FIG. 13. These R measuring cycles preferably occur every hour to preserve power in source 165, FIG. 12, but may be at other cycle duration time periods according to a given implementation. These monitoring cycles are shown at step 202, FIG. 14.

At cycle 2 and up after the start step 147, FIG. 15A, in the period between 12 hourly intervals, cycle 1, 12, 24-n, the measured R value of the wire of a cable 6', in digital format as converted by an analog to digital converter (ADC) (not shown) is compared to the previously measured R value at hold-area 1 at step 155, FIG. 15A. A comparison of the present measured R value is made to the previous measured R value in this and the following cycles up to cycle 12 (hour 12 after the start of the R measurement cycles). Each cycle is counted in step 151 and if not 1, 12, 24 or any multiple of 12, the present R is compared to the prior R measured value instead of referring to the table of T and V values.

The comparison of present to prior measured R values is made because it is presumed that the value of T and V of the ambient temperature and the power voltage will not vary significantly in a one hour time period and that from hour to hour the variation in T and V will not be significant over a 12 hour time period. This presumption is to save power and memory from a large table of V and T that might otherwise have to be compiled for each hour.

However, at the end of each 12 hour period, in step 151, FIG. 15A, the R value is compared to the stored table of V and T values for the measured V and T values of the present power source 165 state and the present ambient temperature as measured by sensor 176, FIG. 12. This confirms that the actual R value as measured each 12 hours is within the desired range for the present ambient conditions. If a fault is detected wherein the R measured does not match the table R (or range of values) for the measured T and V values, a fault signal will be generated at step 192, FIG. 15A, and in FIG. 15B, this fault signal will result in a cable tampered fault entered into the signal event log memory at step 179 via steps 196, 175, and 179, FIG. 15B.

The sequence of signal processing steps described in FIGS. 15A and B begins with an initial step 147, followed by R value calibration step 192, compare to table of T and V values for each 12 hours, step 153 when R is measured good, and then back to start step 147. When the cycle is 1, 12 etc. and step 192 detects a fault, step 194 exits to step 196 FIG. 15B, wherein it is confirmed that the fault is true at step 175 and then a fault signal is written into the log memory. If no fault is detected at step 192, FIG. 15A, then the R value is saved in hold area 1, step 153. For all intermediate cycles between 1, 12, 24 and so on, step 155 follows step 151 wherein the present R is compared to the prior R and if acceptable at step 157, R is saved at step 161.

Figure 14:
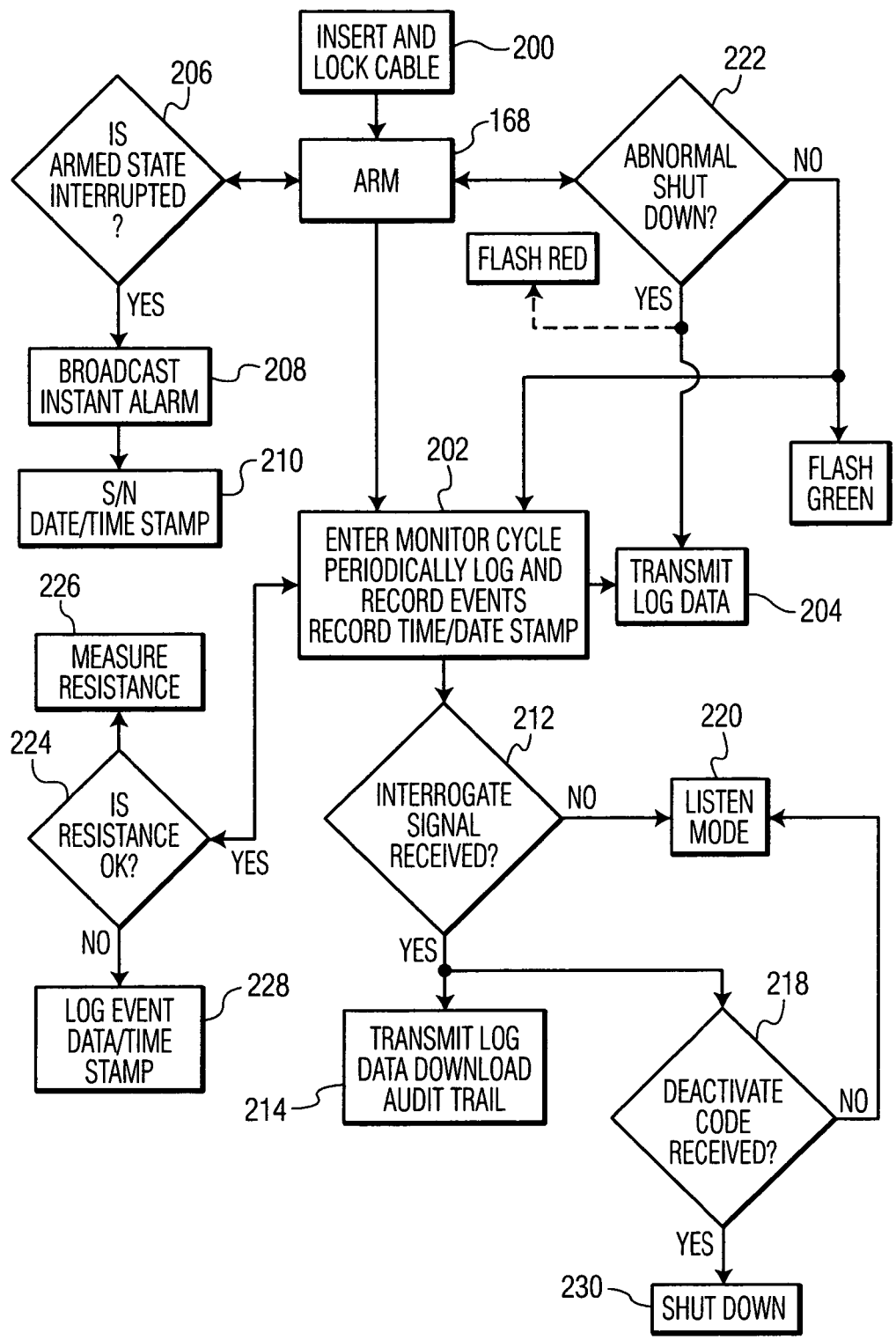
FIG. 14 is a flow chart illustrating the steps performed by a seal according to an embodiment of the present invention.
Figure 15B:
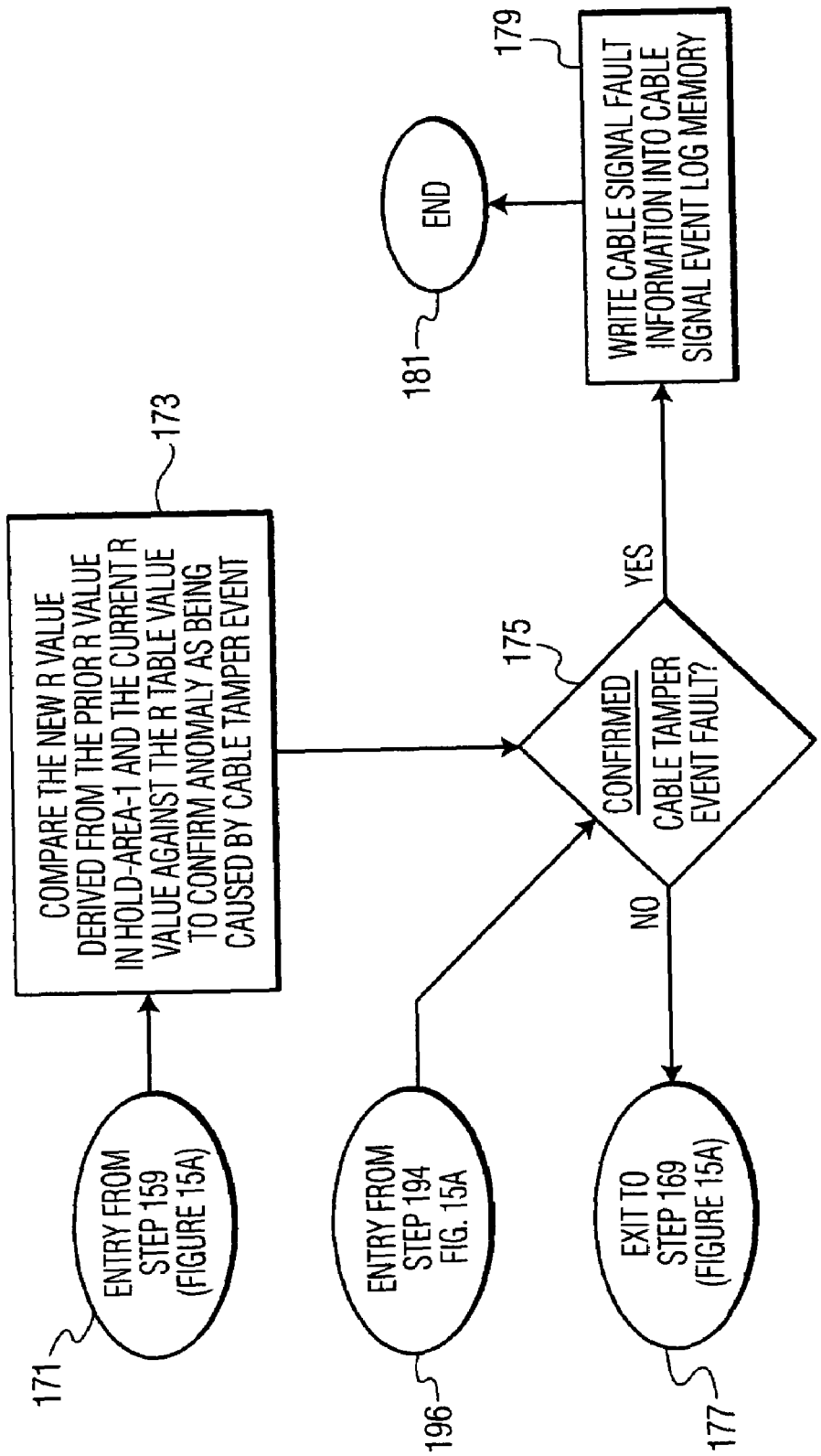

The cable is good R value each 12 hours is stored in memory and becomes an updated logged event at step 202, FIG. 14, which may be, if desired, transmitted at step 204 to a receiver (not shown) via the relay circuit 198, FIG. 12, or directly to a reader/interrogator 158. The fault event is transmitted automatically by the program of module 180, FIG. 13, of the command module 188 of the controller 150 (See also FIG. 12) to the RFID tag 170. In the alternative the tag controller can be programmed to transmit the fault as a result of periodic polling of the tag 170 from the interrogator 158 or internally by the tag 170 controller, as may be desired for a given implementation. Module 186, FIG. 13, of the tag 170 downloads the received fault condition to the transmit event log module 190 of the tag which transmits this information to the reader/interrogator 158 upon interrogation from the interrogator 158 or, automatically as desired under control of controller 172 of the tag 170, FIG. 12.

The controller 150, FIG. 12, is programmed to progressively monitor cable status signals during the armed period, i.e., transmitted signal R values of adjacent in time fault conditions. The controller 150 may be programmed to optionally cause an additional R verification process to be performed by circuit 160, FIG. 12, at step 192, FIG. 15A. This is to eliminate R measured anomalies caused by significant changes in environmental ambient conditions. That is, if at step 155, a fault in R is measured by comparison to the prior measured R stored at hold area 1, the system exits at step 159 to step 171, FIG. 15B. Step 171 proceeds to step 173 wherein the new R value is compared to the table of V and T values to confirm that the fault is real and not due to sudden extreme changes in ambient conditions or power source drop in voltage. If the fault is confirmed, then it is written in the memory at step 179, FIG. 15B.

Optionally, FIG. 12, the tag 170 may also include a relay circuit 198 which under the control of tag controller 172 is part of a mesh network which is commercially available. The relay circuit 198 relays the received fault condition immediately as detected from and to adjacent tag(s) with corresponding relay circuits of adjacent $tag_A$, $tag_B$ and so on to $tag_N$, which mesh network circuits are in wide use on RFID tags in commercially available systems such as from Savi or Intermec companies.

The controller 172 of the RFID tag in this case is programmed to transmit the fault condition which is automatically received by the tag 170 as generated by the command module 188. The adjacent tags then transmit the fault condition to other adjacent tags due to their short transmission range until a central interrogator/receiver at the host administrator 252, FIG. 16, receives the fault condition.

Thus, a cable fault is first detected at the circuit 138 of the seal 4. This event is transmitted on to the next adjacent tag. This event is relayed successively to next adjacent tags until the network administrator 252 receives the fault condition via the internet or other communication system 234, FIG. 16. In the converse, the remote administrator 252 can remotely arm a seal 4 circuit 138 via the same communications and mesh network 234. Thus a centralized administrator 2323 may control multiple deployed cable seals.

The RFID tag 170, FIG. 13, includes the RFID reader/interrogator 158 download command module 184 which is programmed to process the electronic signal that downloads the command from the reader/interrogator 158 (FIG. 12). The programmed download command module 184 initiates the download command controller module 186 which in turn initiates the command module 188 that executes the sequence described above. The transmit event log module 190 is programmed to complete the download command for the circuit 138 initially generated by the reader/interrogator 158. The RFID circuit operates in a conventional manner and such RFID circuits are well known to those of ordinary skill and available from the Savi Corporation, for example, and others.

Figure 16:
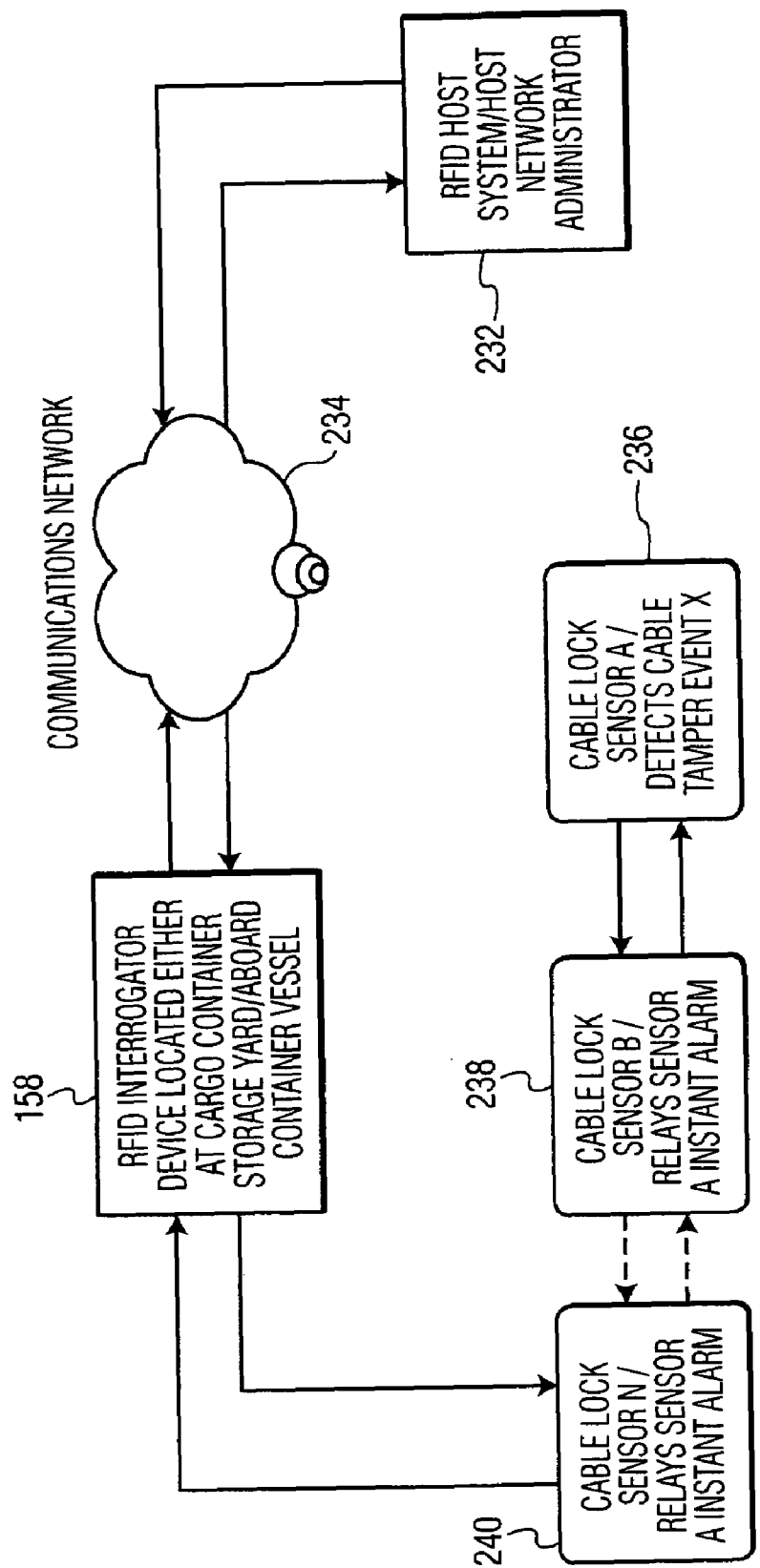
FIG. 16 is a diagram showing the communication system of the seal according to the embodiment of the present invention.

The signal transmitting the fault condition transmits the fault condition, the unique tag serial no. eand container ID and time/date stamp to the central host unit at the network administrator 232, FIG. 16. This identifies the seal with the cable fault so that the container with the seal fault can immediately be identified and located, if necessary, on board a ship, if the network administrator is located there, or at the next port if located there, as applicable, according to an embodiment of the present invention.

The actual range of R values for a given temperature and a given voltage is determined empirically to correlate preset temperatures and battery voltages with a given resistance R value or range of values for that wire. The wire of each preset length is then exposed to different ambient temperatures, e.g., minus 40° to +200° F. at different preset voltages. This is done for example for those temperature ranges within the desired ambient range in which the resistance of the wire variation is minimal, e.g., 1 to 20° variations as may be determined for example and for each anticipated voltage value for each temperature. The resistance and voltages are measured with commercially available devices.

For each measured resistance value or range of values and correlated battery voltage, a table value is created corresponding to the measured temperatures. This table is stored in memory 152. The circuit 138 measures the resistance via circuit 160 and voltage across the wire 126, for example, FIG. 7, via a voltage measuring circuit (not shown). The computer program in module 174, FIG. 13, then compares these measured values with that stored in the table of memory 152 to determine if there is a match.

The circuit 138 also includes an ambient temperature sensor 176 mounted on circuit board assembly 26, FIG. 4, which measures the ambient temperature in the vicinity of the seal. The controller 150 seeks the matching temperature and battery voltage in the memory 152 table (not shown) corresponding to the measured battery voltage and sensed ambient temperature. It then compares the corresponding resistance value with the measured resistance value. If the measured resistance and stored values match within a predetermined range, the controller 150 formats a data signal in the programmed format module 178, FIG. 13, manifesting a non-tamper event. This data signal includes the time/date stamp of the measured resistance and the fact that the resistance was measured as "good" into an event data log which is stored in memory 152 (FIG. 12). These logged events provide an audit trail of log events over the time the container is in a sealed condition.

The resistance and the periodic measuring of the resistance is programmed into the circuit 138. The calibrated resistance is used as a reference resistance variable against which the measured resistance of the cable 6' is periodically compared by polling action of the controller 150 as programmed.

Whenever the measured resistance value is within the range of the reference resistance values no external action occurs. However, optionally, the event may be recorded in memory as a log event, if desired, at step 202, FIG. 14. When the measured resistance deviates beyond a given value, the controller 150 is programmed to sense this state and generate an alarm. The alarm state is downloaded (transmitted to memory or to the tag transmitter for external transmission as desired) with the alarm data and time/date stamp by circuit 162 under control of controller 150, FIG. 12. This action occurs at step 206, FIG. 14, which is "is armed state interrupted" which means a fault in the cable wire has been detected. This state is broadcast at step 208, FIG. 14, to either to the interrogator 158 or to the relay circuits 198 (FIG. 12) of adjacent tags until the RFID host on board the ship receives the warning, FIG. 16. The electronic signal information that is broadcast includes the seal serial no. with the detected fault and the time/date stamp at which the fault is detected, step 210, FIG. 14.

In the alternative, later after the container is unloaded and the information is downloaded (transmitted) at step 212, FIG. 14, in response to an interrogation signal from interrogator 158, FIG. 12, to the tag 170 at this stage of the transit of the container, the tamper condition is downloaded (transmitted) to the host system administrator 232, FIG. 16, identifying the tag and container as having a tampered condition, step 214, FIG. 14. Optionally, as stated above, the circuit 138 may then be shut down at this time as a positive action, if desired at step 218, FIG. 14, by the transmission of a shut down signal from the interrogator 158, FIG. 12.

This shut down signal is detected at step 218 wherein the shut down signal that deactivates the seal circuit would be received. If not received, the listen mode at step 220 remains on alert for such a deactivation signal. The listen step 220 waits for an interrogation signal from step 212. If the seal circuit 138 shuts down for some reason which is an abnormal cycle, at step 222, FIG. 14, or a fault is detected in the cable, the optional red LED 139, on the circuit board, FIG.

4, will flash red, intermittently, to save power and an electronic signal containing the log data stored in memory 152, FIG. 12, is transmitted at step 204. If no abnormal shut down, or no fault is detected, the green LED 137 will flash, preferably intermittently to save power.

It should be understood that the various circuits of FIG. 12 also represent programming instructions in the controller 150 for the different modes for example as shown in FIG. 13. At the end of a given optional predetermined period of operation of the circuit 138, which may be for example, at most about 70 days, representing the time period well beyond that in which a ship transporting cargo containers should reach its destination port after the circuit 138 is armed, the controller may be programmed to automatically shut down the seal's electronic components. However, this shut down of the seal's electronic components is optional as the seal may be allowed to operate until its battery runs down fully notwithstanding that the battery may be charged by a solar cell if desired.

In FIG. 12, an electrical signal, an analog voltage, supplied to the cable 6' wires 104 (FIG. 7) from source 165 has a voltage value of a certain value depending on the charge status of the battery represented by source 165, in circuit 138, FIG. 12. The current for that voltage passes through the copper wire loop core, wires 104, FIG. 7, and is received by the cable signal monitoring circuit 160, FIG. 12. This is shown by steps 224, 226, FIG. 14, representing the R measuring step. This measurement is under control of module 174, FIG. 13, of the command module 188.

In FIG. 4, the circuit 136 optionally includes two LEDs 137 and 139. LED 137 is green and LED 139 is red. These LEDs illuminate depending upon the armed/alarm state of the circuit. When the circuit is armed, the green LED illuminates. It may illuminate steady or flash intermittently. The LEDs are visible externally through the transparent support 22, transparent label 24 or window therein (not shown) if the label is opaque, and through the transparent seal housing lid 18. When an alarm state occurs, the green light extinguishes and the red LED illuminates. In the alternative, the green LED may illuminate whenever the resistance of the wires 104 is polled and found acceptable. If polled and found unacceptable, the green LED if on, is shut off, and the red LED is illuminated, steady or flashes.

The down load (transmission) of log data, represented by circuit 164, FIG. 12, occurs in one instance during normal shut down of circuit 138, which is initiated by the reader/interrogator 158 within the arbitrary 70 day period of operation of the circuit 138. The circuit 138 power source 165, FIG. 12, battery (not shown), may be a button or other type of battery that has a shelf life of about 5 years.

In case there is a condition wherein the cable is severed as occurs during tampering, the resistance will change in the wires 104, 104' of the cables 6', 6", FIGS. 7 and 10, respectively, from a closed circuit to an open circuit. The measured R thus changes and represents a fault. Also, in a further embodiment, the change from closed to open circuit, a continuity test, may be used to detect faults. This open circuit condition is sensed by a circuit (not shown) and when the condition is passed onto the controller 150, causes the controller 150 to generate an alarm state via circuit 162, FIG. 12 and illuminate the red LED and extinguish the green LED, if present. At this time, the controller 150 program will cause a download of the log data, circuit 162, time and date stamp of the alarm indicating an alarm condition and, if desired, optionally all prior measured resistances with their time/date stamps upon interrogation by reader/interrogator 158.

In FIG. 12, the circuit 138 RFID tag 170 may include elements of the circuit of FIG. 11 and further including the programmable EPROM or other programmable devices. Transmitter 156 transmits an encoded signal intermittently at random time intervals, preferably hourly, when the wire 104 resistance is measured hourly, or at other intervals or as the R values are being measured, according to a given implementation. The circuit 138 includes a programmable instruction set for programming a given ID (serial no.), and log data including time and date of resistance measurements manifesting a normal signal.

Programming and manufacturing such a programmed circuit is within the skill of one of ordinary skill in this art. Once the circuit 138 is armed, which may also in the alternative to the methods discussed herein be via an electrically insulated pull tag (not shown) or by the arming of the circuit via contact 146 engaging the cable 6', FIG. 5a, which is commonly used by others, connects the battery to the circuit 138. The circuit 138 begins transmission of the data on a periodic basis, previously programmed into the circuit, via transmitter 156 or in the alternative, selectively in response to interrogation.

The reader/interrogator 158 includes an antenna, a receiver/transmitter and a circuit (not shown) for decoding the received signal and converting it into the desired data for further transmission or display.

If the circuit is interrupted, FIG. 12, e.g., by severing the cable 6' and at least one of the wire pair 102, FIG. 7, conductor 104, the circuit 138 is programmed by the program in the memory 152 to sense this condition at the next polling time via the resistance measuring circuit 160. Even if the wire 104 were to be hot wired by a by pass wire, severed temporarily and then reconnected by soldering or by twisting the wires together, the R of the wire will change at the joined connection and be detected as a fault.

The antenna (not shown) coupled to the receiver 154 and transmitter 156, FIG. 12, comprises a wound wire coil on a surface of the board 136, FIG. 4.

The program of circuit 138, in response to the periodic polling of the resistance R such as on the hourly basis, or in the alternative, upon interruption of power in another embodiment, or upon interruption of the circuit 138, in a still further embodiment, by severing the cable, is programmed to transmit an electronic signal containing the downloaded data noted above, respective steps 204 and 212, FIG. 14. The reader/interrogator 158, FIG. 12, which may be hand held or permanently installed, adjacent to a conveyer of the cargo container or roadway for a trailer truck, transmits and receives the transmitted signal from the seal 4. In FIG. 16, the term "sensor" is referring to the cable wire 104 which is used to sense the fault condition of the cable 6'. The reader/interrogator 158 may be coupled to a local, but remote computer (not shown) or host network administrator 232 via a network 234 which may be the internet or other communications network such as a radio link and so on. The data signal from the reader/interrogator 158 is forwarded to the computer (not shown) of the host system administrator 232, FIG. 16, via the communications network 234. The system administrator 232 may also indicate the detected fault state with a display (not shown) and may be programmed to set off an audible and/or visual alarm also or in the alternative. This alarm is immediate upon receipt of the detected fault and the transmitted signal immediately identifies the seal and the container that has been tampered with. The tampering is noted at a given container location by reading the transmitted signal at a given different shipping and or receiving point at which the administrator 232 is located. The transmission of the signals may be at 900 MHz or 433 MHz protocols or other frequencies. The audit trail event log/linear data set generation may be about 49 bytes total length.

In FIG. 16, the cable wire (wire 104, FIG. 7) and the associated fault detection circuitry and programming is denoted generally as a cable lock sensor, e.g., sensor N 240, which refers to the Nth cable seal 4 each corresponding to a separate one of N containers on a ship, for example. This figure denotes the embodiment where the RFID tags 170, FIG. 12, include a relay circuit 198 which relays the data to adjacent tags A, B,-N. In FIG. 16, cable lock sensor A, 236, detects a cable fault after being interrogated by interrogator 158 via sensors 240-238, and relays the detected fault to next adjacent sensor 238, which relays this information to next adjacent sensors and so on to sensor N, 240. An instant alarm is transmitted from sensor to sensor. The interrogator 158 interrogates sensor A via the N sensors In operation, the seal 4, FIG. 1 is assembled with the cable 6' attached to the extension 80, FIG. 2. In the alternative, the cable 6" of FIG. 10 may be attached to the extension 80 after the locking device 14 is assembled to the housing 16, FIG. 4. In a further alternative, the cable may be locked at both ends to the locking device which includes two locking members 14 but without the extension 80.

The difference in the cables is where the wire pair exits the cable, before the cable end 120 in cable 6', FIG. 7 and at the cable end 120', FIG. 10, and these termination locations are not necessary to or affect the seal function. The seal at this time may or may not have an identifying serial number programmed into the circuit 138. However, the unique serial number on the optional label, FIG. 4, is visible through the lid 18 on the label 24 secured to the support 22 or, in the alternative, imprinted directly on the lid 18 without use of the label 24 and support 22 or imprinted directly on the support 22 without the use of a label 24. The seal 4 unique serial no. or ID is associated with a container (or door etc.) to be secured by remote transmission of this data into its memory and a unique ID or number corresponding to the identification of the container and its contents, which may also be entered in the memory of the seal by remote programming transmission. The seal in the alternative is preprogrammed with the unique ID of the seal and with the data of the cargo container and the like including the container contents prior to being secured to the cargo container.

At this time the cable 6' is inserted fully into the seal locking device 14 until its free end is visible on the opposite side of the seal housing. This locks the cable to the locking device 14 locking member 74. The cable is permanently locked to the locking mechanism and can not be removed without destroying the cable or seal 4.

The circuit 138, once armed will periodically load its memory with the sealed stated of the cable as determined by the measured resistance of its sensor wire such as wire 104, FIG. 7, and will transmit the programmed seal identification and related data to a local interrogator/reader (not shown) upon interrogation or at other intervals as desired. This provides an audit trail of event data log representing an untampered seal.

An alarm condition, when it occurs, is stored in memory 152, and is transmitted when requested, or in the alternative, at the time of detection, e.g., at an hourly polling time. When the alarm condition is read by reader/interrogator 158, the integrity of that container is assumed to have been breached. The reader/interrogator 158 stores the seal number and time/date stamp of the occurrence of the fault detection of each seal that has been breached.

If a number of signals are being transmitted in close proximity, then the signals are distinguished by a signal separation circuit. For example, a circuit as disclosed in the aforementioned copending application incorporated by reference herein may be used or other known circuits as described in the introductory portion may be used.

Any attempt to cut or sever the cable causes an alarm signal to be generated at the time of polling of the resistance of the cable conductor. The alarm signal may be repetitively transmitted. Thus it is important that no interruption of the circuit occurs once the circuit is armed. In some cases, a tamperer may attempt to tamper the seal by spreading the individual wire strands apart to expose the internal wire 104. Then a by pass wire, may be attached across a section of the wire 104 for example by twisting or a soldered connection. Then the by passed section of wire 104 is severed and the container or door opened. The tamperer then will attempt to simulate an untampered wire 104 by reconnecting the severed wire ends together and remove the by pass wire. Then the strands of the cable will be gathered together to appear as a single cable without being severed. It is necessary to detect this condition.

The present invention contemplates this condition by measuring the resistance R of the wire 104 to small resistance values, e.g., micro-ohms. This will detect the presence of solder or twisted wire joints in the wire 104 and manifest a fault condition. The joint(s) present a change in resistance R values for the wire 104 and the circuit 138 module 160, FIG. 12, will detect this condition and indicate a fault. This is important as containers on a ship, truck, train or in a storage yard or any time in a port may be subject to long periods of isolation in which tamperers may have access to the seals 4 to commit such tampering.

However, in the alternative, it may be desirable in some instances to merely detect open circuit conditions only as a fault in a simple continuity test. This might be advantageous where monitoring occurs at frequent intervals, e.g, matter of a few seconds, where by pass or hot wiring tampering attempts will not have sufficient time before polling occurs of the continuity of the cable. Such frequent monitoring may occur where the power source is not in danger of draining fully during the anticipated time period the seal will not be opened or shut down by the user such as with the use of a solar cell to charge the battery. The hourly polling is where long time periods occur between ports of departure and entry of the container ship and the like, and thus conservation of battery power is a factor. The use of a solar cell adds cost, but may be used in certain implementations.

The circuit board assembly 26 may include contacts on the printed circuit board for receiving the mating contacts of a programming unit for programming the circuit in one embodiment such as disclosed in the aforementioned commonly owned '973 patent. In another embodiment the circuit may be preprogrammed with the serial no. and related data entered into the circuit by a received transmission signal.

Several options are available to configure the copper wire loop circuit 138, including dual extruded copper wires, such as wires 104, FIG. 7, which may be spliced at the distal end of the cable assembly to create the loop. Another option is a hollow plastic tube cable core such as tube 116, FIG. 9, which serves as a conduit to encase the copper wire loop of wires 104. Preferably, the cable/housing interface allows the two leads from the copper wire loop to exit the side of the cable at a point about 3.8 cm (1½ inches) from the fixed end 84 of the cable assembly, FIG. 2. This configuration allows the end 84 to be staked to the lock extension 80 without crushing the copper wire in the loop portion whose resistance is to be measured. The overall outside dimensions for the seal housing may be: length about 7.5 cm (3 inches), width about 5 cm (2 inches) and height about 2.5 cm (1 inch).

The seal can be optionally armed when it is secured to the cargo container doors and keeper bars using an 'arm device' electrical circuit with the optional connector assembly 28 mechanical trigger or by transmission of an arm signal to the seal circuit. When so prompted, the seal 4 micro-controller 150 is programmed to initiate a monitoring function for the inserted locked cable when either the 'trigger' circuit is closed or the arm signal is received. When armed, the free end of the cable has been secured to the lock and the seal is secured to a cargo container's doors and keeper bars.

Once the device is set to the armed mode, a pre-programmed sequence of normal events are set up to occur. These are as follows:

A (optional 70 day, more or less than 70 days in the alternative) monitoring audit trail event log is recorded by the controller 150 into the memory 152.

When the RFID tag 170, FIG. 12, state changes from listen mode, FIG. 14, step 220, to a transceive mode, step 218, the controller 150 is programmed, by a signal from module 186 of the tag 170, in response to an interrogation signal from interrogator 158, FIG. 12, to shutdown the monitoring audit trail event log recording and transmit a signal to the active RFID tag 170 module 186, FIG. 13. This signal prompts the active RFID tag controller 172, FIG. 12, to go into log data download mode. This allows an authorized RFID reader/interrogator 158 to initiate a unique transmit audit trail event data log session with the active RFID tag component of the specified seal. An authorized interrogator/reader is one which uses the correct encrypted password to access a particular tag. Both the readers and the controller of the tags use encrypted passwords which are required for a tag to respond to a reader/interrogator 158. The tags may be loaded with the password at the time of arming the seal circuit 138. The password is used each time the seal is accessed by an interrogator. All seals may have the same password if being accessed by the same interrogator 158.

If the programmed log data verification procedure run by the controller 150 indicates a normal monitoring cycle, the controller 150 is then programmed to cause the LED light 137, FIG. 4, to flash green at desired intervals, e.g., 2 seconds, and so on, during the log data download period. (The LED light flash intervals are optional as they are intended to allow direct human visual inspection and may be set to different time intervals as defined by container inspection procedures and device power capacity)

Once the seal 4 is set to the armed mode, the only way to have a normal shutdown completed is to have a valid de-activation code electronic signal transmitted to the device's RFID tag 170, FIG. 12, by an authorized RFID interrogator device 158 which has the correct password (i.e. located pier side, for example, at a port of entry—POE). There is a pre-programmed sequence of events, which represents an in-transit cargo container being secured with a locked seal on it's external doors and keeper bars while pier side at a port of departure; and, subsequently being transported by container vessel to a pier side location at a destination POE (i.e. where an authorized RFID interrogator 158 will read the seal audit trail event data log file).

In the event (for any reason) that this pre-programmed sequence of events does not occur (i.e. the seal 4 cable 6' is tampered with; or, is severed while the cargo container is in-transit), the following event conditions are processed by the seal cable monitoring function (i.e. the controller 150, the optional LEDs, copper wire 104 loop resistance measuring module 160, FIG. 12, a signal bus (not shown), and so on).

A seal status code, i.e., a 1 or a 0, is assigned to the various signals and has an assigned default value of 0 (zero) for example. This value, for example, can only be changed to 1 if the pre-programmed sequence of normal events is verified by the seal controller 150 before the shutdown sequence of the armed device function is completed.

The armed controller 150 processing routine is responsive to a seal internal electronic clock (not shown). Because the armed time period for each specific seal has its own unique normal profile (i.e. activation, i.e., armed, date/time, elapsed day counter, hour cycle counter, deactivation date/time), the abnormal shutdown processing is simple.

If the seal cable 6' is tampered with once the seal 4 has been set to the armed mode, the date/time (to the nearest hour) of the last successful monitoring cable check (i.e., the electronic signal which is transmitted hourly based on the measured acceptable resistance of the wire 104 of the cable) will have been recorded in the monitoring event log memory. This recorded date/time event information is particularly important for US Customs, law enforcement and insurance investigation purposes.

The cable monitoring circuit 138 has a low-power internal calendar/clock (not shown) which is used to build the audit trail event log data. This circuit's two primary functions are to monitor the cable for intrusion events during the seal armed state; and, to create an audit trail event log containing detailed date and time information concerning the seal status (i.e. its integrity), which is read by an authorized RFID interrogator using the RFID tag 170.

The primary function of the RFID tag 170 is to transmit the audit trail event data log (e.g., 49-60 bytes long in a serial data bit stream) to any authorized RFID interrogator 158 with the correct password within a range of 20 feet for example. Because the operational environment is heavily metallized (i.e, steel cargo container yards having possibly hundreds of steel containers in close proximity to each other), an active RFID tag (such as the Chipcon model CC1010) is preferable. An RFID transmission protocol of 433 MHz and/or 920 MHz and so on may be used (i.e., the seals may be configured to transmit only when they are located pier side at Ports of Entry—POE, for example, USPOE, using the North American RFID protocol).

A preferred secondary function of the RFID tag 170 is to transmit a general successful lock install message of specific seal information to a local authorized RFID interrogator 158 at the time of the seal installation on the cargo container's door handles and keeper bars (not shown). Because many foreign ports restrict RFID transmissions to only authorized transmission protocols, this secondary function may or may not be enabled.

The RFID active tag 170 preferably has three functional modes as follows:

Sleep Mode

Prior to the time the seal circuit is armed (i.e. prior to the time the seal is secured to a cargo container's door handles and keeper bars), the RFID tag 170 is in a low-power 'sleep' mode. The arming function of the circuit 138 (i.e. when the cable 6' is inserted into the locking device 14 in the seal housing or the seal is armed by a remote transmission signal)

wakes up the RFID active tag 170 and puts it into a low-power listen mode, step 220, FIG. 14.

Listen Mode

The function of the low-power listen mode is to be on the alert for an electronic transmission prompt being broadcast by any authorized RFID interrogator. Once a signal from an authorized RFID interrogator 158 is identified and processed by the specified RFID tag, the RFID tag functional state changes from 'listen' mode to 'transceive' mode.

Transceive Mode

This simultaneously transmits and receives electronic signals from an authorized RFID interrogator. This function may optionally begin after the normal shutdown of the armed function. Additionally, the red/green LED light will flash either green (normal) or red (abnormal) at preferably some repetitive interval, e.g., two second intervals, during the transceive mode duration. When the audit trail event log data download (i.e., from the circuit 138 to the RFID interrogator) is complete, the transceive mode will stop, although the LED light function (either green or red) will continue to flash at other intervals, e.g., eight second intervals, until the reserves of the battery attached to the circuit 138 are gone.

Failure Functionality

Due to any number of circumstances (i.e. incidental damage, intentional seal destruction, etc.), a seal control circuit may fail during what was intended to be a normal armed service period. Depending on the severity and exact nature of damage that the specific circuit has sustained, the following possible device operational status conditions have been identified:

Cable has been damaged (i.e. severed cable) with the seal housing and lock intact and functional.

Cable is intact and seal housing has been damaged (i.e. smashed or torn open).

Cable has been damaged and also the housing has been damaged.

The memory 152 includes a non-volatile electronic flash memory, FIG. 12. Thus it is possible to retrieve audit trail event log data from a damaged seal. The seal 4 preferably uses a Lithium ion battery, is shock and temperature resistant (temperature range from −50° F. to +120° F., −10° C. to +49° C.), is salt water resistant and has high humidity tolerance. The seal preferably has a five year effective shelf life and is worldwide 'time-zone' agnostic, exhibiting autonomous operation under all conditions. Preferably it is resistant to strong electrical fields (i.e. generators, transformers, etc.) exposure. Preferably, the only method to de-activate the armed condition, except for power failure, is for an authorized RFID interrogator device 158 to initiate a normal shutdown sequence for the armed condition. This normal de-activation can occur at any time after the armed condition has been activated. In the event there is an abnormal shutdown during the armed period, the controller 150 records the audit trail event log data up to the exact point in time when the abnormal shutdown of the device occurs. This allows the recorded audit trail event log information to be downloaded by an authorized RFID interrogator 158 later.

During audit trail event log data download, whether or not the armed state of the seal has been shutdown, the device's RFID tag transmits an electronic signal containing the audit trail event log data to an authorized RFID interrogator device as a serial data bit stream. During and after the audit trail event log data download, the optional red/green LED lights mounted on the PCB assembly 26 preferably intermittently flash 'green.'

When the armed state for the seal has been abnormally interrupted by a cable fault sensed condition, the RFID tag 170 is prompted by the controller 150 to begin broadcasting an instant alarm electronic signal, steps 206, 208, and 210, FIG. 14. This electronic signal contains security data (i.e., seal serial number, date/time of detected cable intrusion event, status code) and is intended to alert any authorized RFID interrogator to the detected cable intrusion event for the specified sensor device. The instant alarm situation described above may occur at any time during the armed device period.

The below tables describe the primary electronic components as they function during the sensor device's operational life. Table 5.1 illustrates the functional relationship between the two primary electronic components of the seal and the seal's major operational states.

TABLE 5.1

| Operational State | Controller 150 | RFID Tag 170 |
|---|---|---|
| Disarmed (pre-activation) | Inactive (except for internal clock/calendar) | 'Sleep' Mode (power-down mode) |
| Armed | Active (wire 104 monitor & resistance sensor are active) | RFID Tag 170 listens for de-activation RF signal from authorized RFID interrogator device |
| Instant Alarm (cable intrusion detected) | Active (Red LED light flashes) | Active/RFID Tag transmits instant alarm RF signal |
| Audit Trail Event Log Data Download | Active (green LED light flashes) | Active/Audit Trail Event Data Log RF signal transmission by RFID Tag 170 |
| Disarmed (after audit trail event log data download) | Inactive (Green LED light flashes) | Inactive |
| Disabled | Inactive (serial # and Audit trail event data log is retained in the device's SRAM memory) | Active/Inactive (Note - Depending on the damage to the seal, an alarm signal will be intermittently generated) |

The seal controller 150 is continually running a low-power electronic calendar/clock, which is used to update the audit trail event data log with precise date/time information during the armed operational state. Because the seal may be in this pre-activation operational state for an extended period of time (e.g., several years), the total reserve power for the on-board lithium ion battery is calculated to insure that all the device's operational states function properly in this period. Due to reserve power constraints, a prompt signal to periodically 'wakeup' the RFID tag component preferably is transmitted by the controller 150 periodically, e.g., every 30 seconds during the armed period. The instant alarm signal preferably contains the serial number, calendar date and time (to the hour of the detected tamper event) and the armed status.

The RFID tag will be shut off completely, i.e., sleep, when not in an operational state. The tag will wake for the few seconds that it transmits. An optional auxiliary micro solar cell (not shown) in the circuit 138 (i.e. Clare model #CPC1810) provides a trickle charge to the battery. The primary features of the micro-controller 150 include low memory usage, low power consumption, high flexibility for I/O control and a reduced instruction set computing controller (RISC).

Because the active RFID tag is a power intensive component, i.e., uses considerable relative power, the ability to intermittently shut off the RFID tag completely is important for conserving battery reserve power during the device's operational life cycle. Table 6 illustrates the startup/shutdown sequences required by the RFID tag component during the six defined operational states of the device's life cycle.

TABLE 6

| Circuit 138 operational state | RFID tag component Required function | RFID tag startup/shutdown Sequence description |
|---|---|---|
| Disarmed Device (pre-activation) | N | Tag is shut off completely |
| Armed Device Mode | Y | Tag is powered up by start armed state and begins timed listening polling (on/off) during armed period |
| Instant Alarm (cable intrusion detected) | Y | Tag is started up and begins intermittent transmission of alarm signal |
| Audit Trail Event Log Data Download | Y | Tag is started up and transmits audit trail event log data bit stream to RFID interrogator |
| Disarmed Device (after (audit trail event log data download) | N | Tag is shut off completely |
| Disabled Device | Y/N | Depending on the extent of damage, Tag is started up and transmits prompted diagnostic data to RFID interrogator |

By way of example, the event log processing records data, as follows, when the seal is armed initially, the date and time is stored in memory to the nearest elapsed hour. The memory stores the number of elapsed hours and elapsed days since initial arming. The number of elapsed hours is reset every 24 hours. The date and time to the nearest hour that a fault is first detected is recorded. The cable wire resistance is monitored hourly. The time and date is recorded when the armed device duty cycle deactivation password is received from an RFID interrogator and the monitoring is successfully stopped. The activation password, if any, is the same as the deactivation password, if the deactivation mode is implemented in the programming. The overall status is indicated after arming of the device and no fault is detected during the active (armed) duty cycle or that a tampering event was detected. A status code of 1 is generated when the device is armed and active and all requirements are met during the active duty cycle for detecting a fault condition. The optional green LED illuminates. If a fault condition is detected the status code changes and the optional red LED illuminates.

In FIG. 17, a cargo container 242 includes a pair of hinged doors 244, 246, the doors rotating about hinges (not shown) to the left of door 244 and to the right of door 246. The door 244 is retained and locked closed by a keeper bar 248 and the door 246 is locked closed by a keeper bar 250. A handle 252 is connected by a pivot 254 to the keeper bar 248 and a handle 251 is pivotally connected to keeper bar 250 by pivot 253. The keeper bars 248 and 250 are rotated about fixed pivots (not shown) by the handles. The handle 251 includes a first hasp 249 and the door 246 includes a second hasp 247 secured to the door by a bracket 245. The hasps 247 and 249 have aligned apertures when the door is in the closed locked position shown. Door 244 handle 252 is secured to a corresponding hasp (not shown).

Seal 18 has a cable 256 locked thereto. The cable 256 is wrapped about the pivot 254 bracket 254' and about the keeper bar 250 above and below the pivot 253 bracket 253' as shown. The cable 256 is also passed through the aligned apertures (not shown) of the hasps 247 and 249. The cable 256 has one end 256' fixedly secured to the lock device inside the seal 18 cavity as by staking and the like. The cable 256 has a second free end 256" that is inserted into the seal 18 after being wrapped as described and then passed through the cavity of the seal 18 housing through the lock device inside the cavity, locking the cable to the seal 18. The free end 256" is pulled taut through the seal 18 until all slack is removed. This tightly wraps the cable 256 about the bracket 254' and about keeper bar 250 and through the hasps 247 and 249.

The wrapped bracket 254' and wrapped keeper bar 250 can not rotate due to this taut wrapped arrangement, and thus the doors can not be opened. The hasp of door 244 is not engaged by the cable as the taut wrapped cable about the bracket 254' is sufficient to keep the door from opening. The cable 256 may have a length of about 1.5 to 2 meters for this purpose. The cable length may differ according to a given implementation. The keeper bar 250 can not be rotated by the handle 251 due to the locked status of the hasps 247 and 249, which lock the handle in place. The keeper bar 248 can not be rotated due to the taut wrapped state of the bracket 254'. The keeper bar 248 when rotated requires the bracket 254' to also rotate. But due to the taut cable the bracket 254' can not rotate as there is insufficient slack to do so.

FIG. 18 shows another embodiment in which cable 258 is wrapped about handle 259 pivot bracket 260 associated with keeper bar 262 and wrapped about handle 261 pivot bracket 264 associated with keeper bar 266. The cable free end 257 is pulled taut through the seal 18 to which the other cable end 255 is permanently secured. In this embodiment, neither keeper bar 262 or 266 can rotate due to the taut wrapped state of the cable 258.

In FIG. 19 in a further embodiment, the cable 268 is passed through hasp 263 of handle 265 and hasp 267 attached to the door by bracket 269. The cable 268 is also wrapped about the two hasps with two loops 270. The handle 265 is thus locked in place and can not rotate about keeper bar 272 pivot 271.

It will occur to one of ordinary skill that various modifications may be made to the disclosed embodiments given by way of example and not limitation. It is intended that the scope of the invention be defined by the appended claims. For example, the locking mechanisms, the power source, the cable configuration, the information stored and transmitted, and the transparent housing lid may be changed according to a given implementation. The antenna may be attached to or incorporated into the housing rather than to the circuit board. The serial number may be attached to the housing rather than the label or to the circuit board. The contact arrangements may differ from the disclosed embodiments.

The measured voltages and resistances may differ typically from the stored values by predetermined magnitudes that represent insignificant and normal variations from normal conditions. These differences may for example lie in a range of about 1-10%. Thus if the normal resistance R is about 100 micro ohms, the measured R may have a value of about 100 micro ohms+/-1 to +/-10 micro ohms, for example. The actual range of values of these ranges are determined empirically for a given circuit and set of wires 104.

If required for interference protection purposes, an aluminum Mylar sheath may be used to surround the copper wire loop, protecting the copper wire loop circuit from stray electrical interference, e.g., when the cable is not metal. However, this should be unnecessary where the wire loop is surrounded by a steel or ferrous metal cable.

It should be understood that the conductor may include a single conductor that is looped at one end to form a pair of adjacent parallel conductors or interconnected at one end to form such a pair. That is, the pair may be one wire folded back upon itself to form a pair of adjacent conductors or it may include two wires interconnected at one end to form a loop.

What is claimed is:

1. An electronic security seal comprising:
   a housing having a cavity;
   a cable locking device in the cavity;
   a cable having a hollow core and a first sealed free end and a second end, the second end being secured fixedly secured in the cavity, the first free end for selective insertion into engagement with the received locking device to lock the free end in the cavity;
   an electrical conductor in the cable hollow core, the conductor having a given resistance R, the conductor forming a loop within the cable and extending adjacent to the cable sealed first end, the loop terminating in a second free end with the conductor forming a pair of conductors extending beyond the cable at the cable second end and electrically connected to a first circuit;
   the first circuit located in the housing cavity including a signal generating circuit for generating a first signal manifesting a first cable locked state indicating that the cable free end is locked, the first circuit being responsive to a sensed tamper condition of the conductor for generating a second signal manifesting the sensed tampered condition of the locked cable; and
   a resistance measuring circuit for periodically measuring the resistance value of said electrical conductor loop, the first circuit being responsive to the measuring circuit for generating the second signal when the resistance value of the conductor loop differs from a predetermined reference value to provide a detected tamper condition;
   the first circuit including a power source having an output voltaae that decreases in value during a time period, the first circuit being arranged to correlate the predetermined reference resistance value of the conductor to at least one of a measured ambient temperature value and a measured decreasing power source output voltage value.

2. The electronic security seal of claim 1 wherein the first circuit is arranged to correlate the predetermined reference resistance value of the conductor to both the measured ambient temperature value and to the measured decreasing power source output voltage value.

3. The electronic security seal of claim 1 wherein the power source is at least one of a battery or solar cell.

4. The electronic security seal of claim 1 wherein the first circuit includes a stored table of reference power source output voltage values each corresponding to the predetermined a reference resistance value, the circuit for measuring the power source output voltage value and for comparing the measured output voltage value with the stored reference voltage values to obtain a reference resistance value corresponding to the measured output voltage and for comparing the measured resistance value of the conductor to the obtained reference resistance value.

5. The electronic security seal of claim 1 wherein the first circuit includes an ambient temperature sensor and a stored table of reference temperature values each corresponding to a reference resistance value, the circuit for periodically determining the ambient temperature and for comparing the determined ambient temperature value with the stored reference temperature values to obtain the predetermined reference resistance value and for comparing the measured resistance value of the conductor to the obtained reference resistance value.

6. The electronic security seal of claim 1 wherein the first circuit includes a table of reference resistance values each correlated to a given power source output voltage and ambient temperature, the first circuit for measuring the power source output voltage, the ambient temperature and the conductor resistance and for comparing the measured voltage and ambient temperature to the table voltage and temperature values to obtain the predetermined reference resistance value, the first circuit for comparing the measured resistance value to the predetermined reference resistance value.

7. The electronic security seal of claim 1 wherein the first circuit is responsive to a command signal, the first circuit including a memory for storage of time/date data and being arranged for periodically transmitting an electronic signal containing the time/date and tampered status of the cable during that period upon receipt of the command signal.

8. The electronic security seal of claim 1 wherein the first circuit includes an alarm circuit for generating and transmitting an alarm signal including a data signal manifesting the time/date stamp of the alarm signal upon detection of a tamper condition of the cable manifested by the measured resistance value of the conductor.

9. The electronic security seal of claim 1 including an electrical contact arranged to engage the received locked cable free end for arming the first circuit to commence periodically polling and recording the locked status of the cable and associated time/date of the recording.

10. The electronic security seal of claim 1 including an arming arrangement responsive to a received arm command signal for arming the first circuit and commencing monitoring the locked cable tamper free status.

11. The electronic security seal of claim 10 including a shut down arrangement for shutting down the first circuit at the end of a predetermined period after the arming of the first circuit.

12. The electronic security seal of claim 1 wherein the housing includes a first compartment for receiving the cable and a second compartment containing the first circuit, the first and second compartments being hermetically sealed from each other in the cavity, the second compartment being hermetically sealed from the ambient atmosphere.

13. The electronic security seal of claim 12 wherein the first and second compartments have a common wall, the conductor exiting the cable in the first compartment and passing into the second compartment through the common wall and sealed to the common wall with a hermetic seal.

14. The electronic security seal of claim 1 wherein the locking device includes an extension, the extension for receiving the cable second end, and a cable securing arrangement for fixedly securing the cable second end to the extension.

15. The electronic security seal of claim 14 wherein the arrangement for securing the cable second end to the extension comprises a staked portion in the extension.

16. The electronic security seal of claim 15 wherein the cable with the conductor is aligned with the staked portion.

17. The electronic security seal of claim 14 wherein the cable second end enters the extension in a first cable region, the conductor exiting the cable in a second cable region between the first region and the housing in the cavity.

18. The electronic security seal of claim 13 wherein the common wall forms a lid for enclosing the second compartment.

19. The electronic security seal of claim 1 wherein the seal is for securing the door of a cargo container, the door having keeper bars and a hasp, the cable having a length sufficient to secure the keeper bars and hasp.

20. An electronic securing seal for securing a cargo container door comprising:
   a housing having a cavity;
   a cable locking device in the cavity;
   a cable having a hollow core and a first sealed free end and a second end, the second end being secured fixedly secured in the cavity, the first free end for selective insertion into engagement with the received locking device to lock the free end in the cavity,; and
   an electrical conductor in the cable hollow core, the conductor having a given resistance R and electrically connected to a first circuit;
   the first circuit located in the housing cavity including a signal generating circuit for generating a first signal manifesting a first cable locked state indicating that the cable free end is locked, the first circuit being responsive to a sensed tamper condition of the conductor for generating a second signal manifesting the sensed tampered condition of the locked cable;
   wherein the first circuit includes a cower source having an output voltage that decreases in value during a time period, the first circuit being arranged to correlate the given reference resistance value R of the conductor to at least one of a measured ambient temperature value and a measured decreasing power source output voltage value.

21. The electronic security seal of claim 20 wherein the housing includes a first compartment for receiving the cable and a second compartment containing the first circuit, the first and second compartments being hermetically sealed from each other, the second compartment being hermetically sealed from the ambient atmosphere.

22. The electronic security seal of claim 20 wherein the first circuit is arranged to correlate the given reference resistance value R of the conductor to both the measured ambient temperature value and to the measured power source output voltage value.

23. The electronic security seal of claim 21 including a lid for covering the first compartment for sealing the first compartment from the second compartment.

24. The electronic security seal of claim 23 wherein the cable has a hollow core and a conductor in the core, the circuit for determining the conductivity of the conductor and for issuing a tamper alarm when the conductivity manifests a tampered cable, the conductor for passing through the lid into electrical engagement with the circuit including a sealant for sealing the conductor to the lid.

25. The electronic security seal of claim 20 wherein the electrical conductor forms a loop in the cable core and manifests a given electrical conductivity and having at least one end exiting the cable at the cable second end in the first compartment.

26. The electronic security seal of claim 25 wherein the cable second end is staked to the locking device with the staked region aligned with the conductor.

27. The electronic security seal of claim 20 further including an RFID tag associated with the first circuit, the tag for initializing the first circuit to an armed condition in response to a received arm command signal.

28. The electronic security seal of claim 27 wherein the tag includes a relay circuit for relaying commands and data to and from adjacent seal tags forming a mesh network configuration.

29. The electronic security seal of claim 21 wherein the electrical conductor is electrically connected to the first circuit and sealed to the lid; the first circuit being arranged to compare the measured resistance of the conductor to the correlated given reference resistance value R and for generating a locked good cable signal when the measured resistance matches the given reference value R and for generating a tamper alarm signal when the measured resistance value is different than the reference value R beyond a predetermined range of resistance values.

30. The electronic security seal of claim 29 wherein the first circuit is responsive to the voltage from the power source and is arranged to compare the measured resistance of the conductor to the given reference resistance value R at both a given temperature and a given power source voltage value.

31. The electronic security seal of claim 29 wherein the given reference resistance value R is a function of the conductor open or closed state.

32. The electronic security seal of claim 20 wherein the circuit includes lights manifesting a respective tampered and normal condition of the cable.

33. The electronic security seal of claim 20 wherein the conductor includes a joint when tampered with, the first circuit for determining the presence of the joint and for issuing a tampered condition signal when the joint is present.

34. The electronic security seal of claim 20 wherein the resistance of the conductor varies with ambient temperature and voltage output level of a power source, the first circuit for determining the tampered state of the conductor based on the measured resistance of the conductor as correlated to the values of both the measured ambient temperature and measured power source output voltage.

35. An electronic security seal comprising:
   a housing having a cavity;
   a cable locking device in the cavity;
   a cable having a hollow core and a first sealed free end and a second end, the second end being secured fixedly secured in the cavity, the first free end for selective insertion into engagement with the received locking device to lock the free end in the cavity;
   an electrical conductor in the cable hollow core, the conductor having a given resistance R, the conductor forming a loop within the cable and extending adjacent to the cable sealed first end, the loop terminating in a second free end with the conductor forming a pair of conductors extending beyond the cable at the cable second end and electrically connected to a first circuit;
   the first circuit located in the housing cavity including a signal generating circuit for generating a first signal manifesting a first cable locked state indicating that the cable free end is locked, the first circuit being responsive to a sensed tamper condition of the conductor for generating a second signal manifesting the sensed tampered condition of the locked cable;
   a resistance measuring circuit for periodically measuring the resistance value of said electrical conductor loop, the first circuit being responsive to the measuring circuit for generating the second signal when the resistance value of the conductor loop differs from a predetermined reference value to provide a detected tamper condition; and the first circuit including a power source having an output voltage that decreases in value during a time period, the first circuit being arranged to correlate the predetermined reference resistance value of the conductor to a measured decreasing power source output voltage value.

36. An electronic security seal comprising:
   a housing having a cavity;
   a cable locking device in the cavity;
   a cable having a hollow core and a first sealed free end and a second end, the second end being secured fixedly secured in the cavity, the first free end for selective insertion into engagement with the received locking device to lock the free end in the cavity;
   an electrical conductor in the cable hollow core, the conductor having a given resistance R, the conductor forming a loop within the cable and extending adjacent to the cable sealed first end, the loop terminating in a second free end with the conductor forming a pair of conductors extending beyond the cable at the cable second end and electrically connected to a first circuit;
   the first circuit located in the housing cavity including a signal generating circuit for generating a first signal manifesting a first cable locked state indicating that the cable free end is locked, the first circuit being responsive to a sensed tamper condition of the conductor for generating a second signal manifesting the sensed tampered condition of the locked cable;
   a resistance measuring circuit for periodically measuring the resistance value of said electrical conductor loop, the first circuit being responsive to the measuring circuit for generating the second signal when the resistance value of the conductor loop differs from a predetermined reference value to provide a detected tamper condition;
   the first circuit being arranged to correlate the predetermined reference resistance value of the conductor to a measured ambient temperature value.

37. An electronic securing seal for securing a cargo container door comprising:
   a housing having a cavity;
   a cable locking device in the cavity;
   a cable having a hollow core and a first sealed free end and a second end, the second end being secured fixedly secured in the cavity, the first free end for selective insertion into engagement with the received locking device to lock the free end in the cavity; and
   an electrical conductor in the cable hollow core, the conductor having a given resistance R and electrically connected to a first circuit;
   the first circuit located in the housing cavity including a signal generating circuit for generating a first signal manifesting a first cable locked state indicating that the cable free end is locked, the first circuit being responsive to a sensed tamper condition of the conductor manifested by a shift in the reference resistance value R from a predetermined amount for generating a second signal manifesting the sensed tampered condition of the locked cable;
   the first circuit including a power source having an output voltage that decreases in value during a time period, the first circuit being arranged to correlate the given resistance R value to a measured decreasing power source output voltage value.

38. An electronic securing seal for securing a cargo container door comprising:
   a housing having a cavity;
   a cable locking device in the cavity;
   a cable having a hollow core and a first sealed free end and a second end, the second end being secured fixedly secured in the cavity, the first free end for selective insertion into engagement with the received locking device to lock the free end in the cavity, the cable having a length sufficient to secure the keeper bars and hasp of the cargo container door; and
   an electrical conductor in the cable hollow core, the conductor having a given resistance R and electrically connected to a first circuit; the first circuit located in the housing cavity including a signal generating circuit for generating a first signal manifesting a first cable locked state indicating that the cable free end is locked, the first circuit being responsive to a sensed tamper condition of the conductor for generating a second signal manifesting the sensed tampered condition of the locked cable manifested by a shift in the reference resistance value R from a predetermined amount;
   the first circuit being arranged to correlate the reference resistance value R of the conductor to a measured ambient temperature value.

* * * * *

UNITED STATES PATENT AND TRADEMARK OFFICE
CERTIFICATE OF CORRECTION

| | | |
|---|---|---|
| PATENT NO. | : 7,239,238 B2 | Page 1 of 1 |
| APPLICATION NO. | : 11/081930 | |
| DATED | : July 3, 2007 | |
| INVENTOR(S) | : Theodore R. Tester, Robert F. Debrody and Donald A. Ruth | |

It is certified that error appears in the above-identified patent and that said Letters Patent is hereby corrected as shown below:

Column 35, line 43: change "voltaae" to -- voltage --

Column 39, line 5: change "dunng" to -- during --

Signed and Sealed this

Fourteenth Day of August, 2007

JON W. DUDAS
*Director of the United States Patent and Trademark Office*